(12) United States Patent
Stettiner

(10) Patent No.: US 11,520,003 B2
(45) Date of Patent: Dec. 6, 2022

(54) DETECTION, MITIGATION AND AVOIDANCE OF MUTUAL INTERFERENCE BETWEEN AUTOMOTIVE RADARS

(71) Applicant: Arbe Robotics Ltd., Tel Aviv (IL)

(72) Inventor: Yoram Stettiner, Kerem Maharal (IL)

(73) Assignee: Arbe Robotics Ltd.

( * ) Notice: Subject to any disclaimer, the term of this patent is extended or adjusted under 35 U.S.C. 154(b) by 361 days.

(21) Appl. No.: 16/766,695

(22) PCT Filed: Nov. 25, 2018

(86) PCT No.: PCT/IL2018/051275
§ 371 (c)(1),
(2) Date: May 24, 2020

(87) PCT Pub. No.: WO2019/106656
PCT Pub. Date: Jun. 6, 2019

(65) Prior Publication Data
US 2020/0393536 A1    Dec. 17, 2020

(30) Foreign Application Priority Data
Nov. 29, 2017   (IL) .......................................... 255982

(51) Int. Cl.
     *G01S 7/28*        (2006.01)
     *G01S 7/40*        (2006.01)
     *H04B 1/715*     (2011.01)

(52) U.S. Cl.
CPC .......... *G01S 7/2813* (2013.01); *G01S 7/4056* (2013.01); *H04B 1/715* (2013.01); *H04B 2001/7152* (2013.01)

(58) Field of Classification Search
CPC ..... G01S 7/2813; G01S 7/4056; H04B 1/715; H04B 2001/7152
See application file for complete search history.

(56) References Cited

U.S. PATENT DOCUMENTS 3,603,989 A    9/1971   Caspers
3,981,012 A    9/1976   Brault
(Continued)

FOREIGN PATENT DOCUMENTS

CN        1967286 A     5/2007
CN    101950851 A     1/2011
(Continued)

OTHER PUBLICATIONS

Comparative Performance Analysis of Hamming, Hanning and Blackman Window by Prajoy Podder at International Journal of Computer Applications (0975-8887) vol. 96—No. 18, Jun. 2014 (Year: 2014).
(Continued)

*Primary Examiner* — Natasha W Cosme
(74) *Attorney, Agent, or Firm* — Zaretsky Group PC; Howard Zaretsky

(57) ABSTRACT

A novel and useful radar sensor incorporating detection, mitigation and avoidance of mutual interference from nearby automotive radars. The normally constant start frequency sequence for linear large bandwidth FMCW chirps is replaced by a sequence of lower bandwidth chirps with start frequencies spanning the wider bandwidth and randomly ordered in time to create a pseudo random chirp hopping sequence. The reflected wave signal received is reassembled using the known hop sequence. To mitigate interference, the signal received is used to estimate collisions with other radar signals. If detected, a constraint is applied to the randomization of the chirps. The chirp hopping sequence is altered so chirps do not interfere with the interfering radar's chirps. Offending chirps are re-randomized, dropped altogether or the starting frequency of another non-offending chirp is reused. Windowed blanking is used to
(Continued)

zero the portion of the received chirp corrupted with the interfering radar's chirp signal.

18 Claims, 15 Drawing Sheets

(56) References Cited

U.S. PATENT DOCUMENTS

| | | | |
|---|---|---|---|
| 4,166,980 A | 9/1979 | Apostolos | |
| 4,197,540 A | 4/1980 | Riggs | |
| 4,494,083 A | 1/1985 | Josefsson | |
| 4,926,185 A | 5/1990 | Wittenberg | |
| 5,063,603 A | 11/1991 | Burt | |
| 5,424,742 A | 6/1995 | Long | |
| 5,430,445 A | 7/1995 | Peregrim | |
| 5,442,362 A | 8/1995 | Zwarts | |
| 5,923,280 A | 7/1999 | Farmer | |
| 5,955,992 A | 9/1999 | Shattil | |
| 6,028,548 A | 2/2000 | Farmer | |
| 6,121,915 A * | 9/2000 | Cooper | G01S 13/64 342/70 |
| 6,828,929 B2 | 12/2004 | Barbella | |
| 6,865,216 B1 | 3/2005 | Beamish | |
| 6,888,887 B1 | 5/2005 | Shattil | |
| 6,989,782 B2 | 1/2006 | Walker | |
| 7,071,868 B2 | 7/2006 | Woodington | |
| 7,308,043 B1 | 12/2007 | Frank | |
| 7,639,171 B2 | 12/2009 | Alland | |
| 7,804,445 B1 | 9/2010 | Fiore | |
| 7,835,455 B2 | 11/2010 | Shattil | |
| 8,035,038 B2 | 10/2011 | Cheng | |
| 8,175,134 B1 | 5/2012 | Giallorenzi | |
| 8,599,062 B2 | 12/2013 | Szajnowski | |
| 8,803,732 B2 | 8/2014 | Antonik | |
| 8,970,425 B2 | 3/2015 | Nogueira-Nine | |
| 9,250,322 B2 | 2/2016 | Newman | |
| 9,645,228 B1 | 5/2017 | Doerry | |
| 9,791,564 B1 | 10/2017 | Harris | |
| 10,082,570 B1 | 9/2018 | Izadian | |
| 10,094,920 B2 | 10/2018 | Rao | |
| 10,359,504 B2 | 7/2019 | Fetterman | |
| 10,451,723 B2 | 10/2019 | Chiu | |
| 11,199,617 B2 | 12/2021 | Hakobyan | |
| 11,277,902 B2 | 3/2022 | Snir | |
| 2003/0151476 A1 | 8/2003 | Salmela | |
| 2004/0150552 A1 | 8/2004 | Barbella | |
| 2004/0196172 A1 | 10/2004 | Wasiewicz | |
| 2005/0156780 A1 | 7/2005 | Bonthron | |
| 2005/0232182 A1 | 10/2005 | Shattil | |
| 2007/0040728 A1 | 2/2007 | Nishimura | |
| 2007/0171123 A1 | 7/2007 | Nakano | |
| 2007/0205847 A1 | 9/2007 | Kushta | |
| 2008/0284641 A1 | 11/2008 | Spreadbury | |
| 2008/0317345 A1 | 12/2008 | Wiedemann | |
| 2009/0085800 A1 | 4/2009 | Alland | |
| 2011/0122014 A1 | 5/2011 | Szajnowski | |
| 2012/0056780 A1 | 3/2012 | Antonik | |
| 2012/0146846 A1 | 6/2012 | Antonik | |
| 2012/0169523 A1 | 7/2012 | Lee | |
| 2012/0235859 A1 | 9/2012 | Hayase | |
| 2012/0313810 A1 | 12/2012 | Nogueira-Nine | |
| 2013/0009806 A1 | 1/2013 | Newman | |
| 2013/0257670 A1 | 10/2013 | Sovero | |
| 2014/0022113 A1 | 1/2014 | Nogueira-Nine | |
| 2014/0079248 A1 | 3/2014 | Short | |
| 2014/0211438 A1 | 7/2014 | Lin | |
| 2014/0320231 A1 | 10/2014 | Seler | |
| 2014/0355385 A1 | 12/2014 | Inagaki | |
| 2015/0061928 A1 | 3/2015 | Cornic | |
| 2016/0018511 A1 | 1/2016 | Nayyar | |
| 2016/0061942 A1 | 3/2016 | Rao | |
| 2016/0084941 A1 | 3/2016 | Arage | |
| 2016/0131738 A1 | 5/2016 | Prechtel | |
| 2016/0139254 A1 | 5/2016 | Wittenberg | |
| 2016/0187477 A1 | 6/2016 | Wang | |
| 2016/0285611 A1 | 9/2016 | Fischer | |
| 2016/0334502 A1 | 11/2016 | Ali | |
| 2016/0377711 A1 | 12/2016 | Arage | |
| 2017/0131394 A1 | 5/2017 | Roger | |
| 2017/0219689 A1* | 8/2017 | Hung | G01S 13/931 |
| 2017/0307744 A1 | 10/2017 | Loesch | |
| 2017/0343648 A1 | 11/2017 | Trotta | |
| 2018/0045819 A1 | 2/2018 | Cornic | |
| 2018/0095162 A1 | 4/2018 | Fetterman | |
| 2018/0172816 A1 | 6/2018 | Chiu | |
| 2018/0350751 A1 | 12/2018 | Sun | |
| 2019/0004167 A1 | 1/2019 | Rao | |
| 2019/0050372 A1 | 2/2019 | Zeng | |
| 2019/0235066 A1 | 8/2019 | Iida | |
| 2019/0265346 A1 | 8/2019 | Hakobyan | |
| 2020/0011968 A1 | 1/2020 | Hammes | |
| 2020/0176393 A1 | 6/2020 | Ketterson | |
| 2020/0388578 A1 | 12/2020 | Lim | |
| 2021/0156980 A1 | 5/2021 | Stettiner | |
| 2021/0156981 A1 | 5/2021 | Stettiner | |
| 2021/0156982 A1 | 5/2021 | Stettiner | |
| 2021/0184340 A1 | 6/2021 | Stav | |
| 2021/0263147 A1 | 8/2021 | Bauer | |
| 2021/0275056 A1 | 9/2021 | McMahon | |
| 2021/0293923 A1 | 9/2021 | Arkind | |
| 2021/0318413 A1 | 10/2021 | Arkind | |
| 2021/0320425 A1 | 10/2021 | Arkind | |

FOREIGN PATENT DOCUMENTS

| | | | |
|---|---|---|---|
| CN | 106100696 A | 11/2016 | |
| CN | 108089163 A | 5/2018 | |
| DE | 102013216251 A1 | 2/2015 | |
| DE | 102015218538 A1 | 3/2017 | |
| DE | 102016224900 A1 | 6/2018 | |
| EP | 0132795 A2 | 2/1985 | |
| EP | 3165941 A1 | 5/2017 | |
| GB | 2462148 A | 2/2010 | |
| WO | 2017/069679 A1 | 4/2017 | |
| WO | 2017/208670 A1 | 12/2017 | |
| WO | 2018/138725 A1 | 8/2018 | |
| WO | 2018/142395 A1 | 8/2018 | |
| WO | 2018/142396 A1 | 8/2018 | |

OTHER PUBLICATIONS

Jason Yu et al: "Multiband chirp synthesis for frequency-hopped FMCW radar", Signals, Systems and Computers, 2009 Conference Record of the Forty-Third Asilomar Conference ON, IEEE, Piscataway, NJ, USA, Nov. 1, 2009 (Nov. 1, 2009), pp. 1315-1319, XP031679466, ISBN: 978-1-4244-5825-7.

Laribi Amir et al: "A new height-estimation method using FMCW radar Doppler beam sharpening", 2017 25th European Signal Processing Conference (EUSIPCO), EURASIP, Aug. 28, 2017 (Aug. 28, 2017), pp. 1932-1396, XP033236275, DOI: 10.23919/EUSIPC0.2017.8081546 [retrieved on Oct. 23, 2017].

Mlralles E, Multerer T, Ganis A, Schoenlinner B, Prechtel U, Meusling A, Mietzner J, Weckerle C, Esteban H, Vossiek M, Loghik M. Multifunctional and compact 3D FMCW MIMO radar system with rectangular array for medium-range applications. IEEE Aerospace and Electronic Systems Magazine. May 7, 2018;33(4):46-54. Enric Miralles May 7, 2018 (May 7, 2018).

* cited by examiner

DETECTION, MITIGATION AND AVOIDANCE OF MUTUAL INTERFERENCE BETWEEN AUTOMOTIVE RADARS

FIELD OF THE INVENTION

The subject matter disclosed herein relates to the field of automotive radar and more particularly relates to a system and method for detecting, mitigating, and avoiding mutual interference between automotive radars.

BACKGROUND OF THE INVENTION

Recently, applications of radars in the automotive industry have started to emerge. High-end automobiles already have radars that provide parking assistance and lane departure warning to the driver. Currently, there is a growing interest in self-driving cars and some people consider it to be the main driving force of the automotive industry in the coming years.

Self-driving cars offer a new perspective on the application of the radar technology in automobiles. In addition to assisting the driver, automotive radars will be capable of taking an active role in the control of the vehicle. They are thus likely to become a key sensor of the autonomous control system of a car.

Radar is preferred over the other alternatives such as sonar or LIDAR as it is less affected by the weather conditions and can be made very small to decrease the effect of the deployed sensor to the vehicle's aerodynamics and appearance. The Frequency Modulated Continuous Wave (FMCW) radar is a type of radar that offers more advantages compared to the others. It ensures the range and velocity information of the surrounded objects can be detected simultaneously. This information is very crucial for the control system of the self-driving vehicle to provide safe and collision-free operation.

Currently, vehicles, especially cars, are increasingly equipped with technologies designed to assist the driver in critical situations. Besides cameras and ultrasonic sensors, car makers are turning to radar as the cost of the associated technology decreases. The attraction of radar is that it provides fast and clear-cut measurement of the velocity and distance of multiple objects under any weather conditions. The relevant radar signals are frequency modulated and can be analyzed with spectrum analyzers. In this manner, developers of radar components can automatically detect, measure and display the signals in the time and frequency domains, even up to frequencies of 500 GHz.

There is also much interest now in using radar in the realm of autonomous vehicles which is expected to become more prevalent in the future. Millimeter wave automotive radar is suitable for use in the prevention of car collisions and for autonomous driving. Millimeter wave frequencies from 77 to 81 GHz are less susceptible to the interference of rain, fog, snow and other weather factors, dust and noise than ultrasonic radars and laser radars.

Typical automotive radar systems comprise a millimeter wave frequency transmitter and receiver. Each transmitter emits a millimeter wave radio signal which is reflected or scattered from surrounding objects. The echoes or reflections are processed by the receivers and range and velocity of the objects are measured. The radar signal comprises either continuous or pulse modulation.

The radar system should be able to provide the information required by the control system in the vehicle in real-time. A baseband processing system is needed that is capable of providing enough computing power to meet real-time system requirements. The processing system performs digital signal processing on the received signal to extract the useful information such as range and velocity of the surrounded objects.

Currently, vehicles, especially cars, are increasingly equipped with advanced driver assistance systems (ADAS) designed to assist the driver in critical situations. ADAS systems are developed to automate, adapt, and enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are several forms of ADAS available: some features are built into cars or are available as an add-on package. In addition, there are aftermarket solutions available. ADAS relies on inputs from multiple data sources, including automotive imaging, Light Detection and Ranging (LIDAR), radar, image processing, computer vision, and in-car networking. Additional inputs are possible from other sources separate from the primary vehicle platform, such as other vehicles, referred to as vehicle-to-vehicle (V2V), or vehicle-to-infrastructure system (e.g., mobile telephony or Wi-Fi data network).

ADAS are currently one of the fastest growing segments in automotive electronics, with steadily increasing rates of adoption of industry wide quality standards, in vehicular safety systems including ISO 26262, developing technology specific standards, such as IEEE 2020 for image sensor quality and communications protocols such as the Vehicle Information API.

Currently, vehicles, especially cars, are increasingly equipped with technologies designed to assist the driver in critical situations. Besides cameras and ultrasonic sensors, car makers are turning to radar as the cost of the associated technology decreases. The attraction of radar is that it provides fast and clear-cut measurement of the velocity and distance of multiple objects under any weather conditions. The relevant radar signals are frequency modulated and can be analyzed with spectrum analyzers. In this manner, developers of radar components can automatically detect, measure and display the signals in the time and frequency domains, even up to frequencies of 500 GHz.

There is also much interest now in using radar in the realm of autonomous vehicles which is expected to become more prevalent in the future. Millimeter wave automotive radar is suitable for use in the prevention of car collisions and for autonomous driving. Millimeter wave frequencies from 77 to 81 GHz are less susceptible to the interference of rain, fog, snow and other weather factors, dust and noise than ultrasonic radars and laser radars.

In recent years many industries are moving to autonomous solutions such as the automotive industry, delivery services, etc. These autonomous platforms operate in the environment while interacting with both the stationary and moving objects. For this purpose, these systems require a sensor suite which allows them to sense their surrounding in a reliable and efficient manner. For example, if an autonomous vehicle needs to plan its route on a road with other vehicles on it, the trajectory planner must have a 3D map of the environment with indication of moving objects.

Visual sensors are degraded by bad weather and poor visibility (e.g., fog, smoke, sand, rain or snow storms, etc.). They are also limited in estimating radial velocities. LIDAR systems are used to measure distance to a target by illuminating that target with laser light. These sensors, however, are expensive, as most are very range limited. Thus, automotive radar is seen as an augmenting technology and not replacement technology.

There is much interest in using radar in the realm of autonomous vehicles which is expected to become more prevalent in the future, as the cost of the associated technology decreases. A radar is less affected by the weather conditions and can be made very small to decrease the effect of the deployed sensor on the vehicle's aerodynamics and appearance. The radar provides fast and clear cut measurement of the range and velocity information of the surrounded objects simultaneously, which is crucial for the control system of the self-driving vehicle for providing safe and collision-free operation.

Millimeter wave automotive radar is suitable for use in the prevention of car collisions and for autonomous driving. Millimeter wave frequencies from 77 to 81 GHz are less susceptible to the interference of rain, fog, snow and other weather factors, dust and noise than sonar and LIDAR.

In the automotive field, radar sensors are key components for comfort and safety functions, such as adaptive cruise control (ACC) or collision mitigation systems (CMS). With an increasing number of automotive radar sensors operated close to each other at the same time, radar sensors may receive signals from other radar sensors. The reception of foreign signals (interference) can lead to problems such as ghost targets or a reduced signal-to-noise ratio. Such an automotive interference scenario with direct interference from several surrounding vehicles is depicted in FIG. 1.

So far, interference has not been considered as a major problem because the vehicles equipped with radar sensors are rare and therefore the probability of interference was low. In this case it may be sufficient to detect interference and turn off the function (i.e. the entire radar) for the duration of the interference. Radar based safety functions of future systems, however, will require very low failure rates. Therefore, radar-to-radar interference is a major problem in radar sensor networks, especially when several radars are concurrently operating in the same frequency band and mutually interfering with each another. Note that the currently installed base of radars cannot be expected to synchronize with new automotive radar sensor entrants, nor with any global synchronization schemes.

As stated supra, a major challenge facing the application of automotive radar to autonomous driving is the highly likely situation where several unsynchronized radars, possibly from different vendors, operate in geographical proximity and utilize overlapping frequency bands Therefore, it is desirable to have an automotive radar sensor that can minimize its own interference with other radars, with special focus on existing ADAS radars, as well as mitigate the interference by other nearby radars. It is further desirable to have effective techniques (i.e. countermeasures) to minimize mutual interference even in high traffic density scenarios (e.g., in large cities) and considering that the percentage of vehicles equipped with radar sensors will likely increase greatly in the near future.

SUMMARY OF THE INVENTION

The present invention is a frequency modulated continuous wave (FMCW) radar sensor incorporating the ability to detect, mitigate and avoid mutual interference from other nearby automotive radars. The normally constant start frequency sequence for linear large bandwidth FMCW chirps is replaced by a sequence of lower bandwidth chirps with start frequencies spanning the wider bandwidth and randomly ordered in time (as opposed to an ever-increasing sequence of start frequencies) to create a pseudo random chirp frequency hopping sequence. The reflected wave signal received is then reassembled using the known hop sequence, and utilizing well known signal processing techniques.

To mitigate interference, a dedicated receiver is provided with wideband listening capability. The received signal is used to estimate collisions with other radar signals. If interference is detected, a constraint is applied to the randomization of the chirps. The hopping sequence and possibly also the slope of individual chirps are altered so that chirps would not interfere with the interfering radar's chirps. Offending chirps are either re-randomized, dropped altogether or the starting frequency of another non-offending chirp is reused.

In addition, if interference is detected, windowed blanking is used to zero the portion of the received chirp corrupted with the interfering radar's chirp signal. In addition, the victim radar ceases its own transmission while interference is detected with the purpose of minimizing the interference inflicted by itself received on the interfering radar.

Note that the mitigation techniques of the present invention are applicable to both MIMO radars as well as non-MIMO radars.

There is thus provided in accordance with the invention, a method of mitigating interference in a radar, the method comprising generating a plurality of frequency modulated continuous wave (FMCW) chirps having relatively small bandwidth and short duration, randomizing starting frequencies of said plurality of chirps, and wherein said randomized starting frequencies span a relatively large bandwidth.

There is also provided in accordance with the invention, a method of mitigating interference in a victim radar, the method comprising generating a plurality of frequency modulated continuous wave (FMCW) chirps having relatively small bandwidth and short duration, randomizing starting frequencies of said plurality of chirps, detecting one or more interfering radar chirp signals, constraining said randomization such that a number of victim radar chirps that collide with interfering radar chirps in a time-frequency domain is minimized, and wherein said randomized starting frequencies span a relatively large bandwidth.

There is further provided in accordance with the invention, a method of mitigating interference in a victim radar, the method comprising generating a plurality of frequency modulated continuous wave (FMCW) chirps having relatively small bandwidth and short duration, randomizing starting frequencies of said plurality of chirps, detecting one or more interfering radar chirp signals, blanking one or more victim radar chirps or a portion thereof that are corrupted by interfering radar chirps, and wherein said randomized starting frequencies span a relatively large bandwidth.

There is also provided in accordance with the invention, a sensor for use in a victim automotive radar, comprising a first plurality of transmitting antennas, a second plurality of receiving antennas, a transceiver coupled to said first plurality of transmitting antennas and said second plurality of receiving antennas, said transceiver operative to generate and supply transmitting signals to said first plurality of transmitting antennas and receive signals of waves reflected back to said second plurality of receiving antennas, said transceiver operative to generate a plurality of frequency modulated continuous wave (FMCW) chirps having relatively small bandwidth and short duration, randomize starting frequencies of said plurality of chirps, detect one or more interfering radar chirp signals, and wherein said randomized starting frequencies span a relatively large bandwidth.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein.

DETAILED DESCRIPTION OF THE INVENTION

Figure 1:
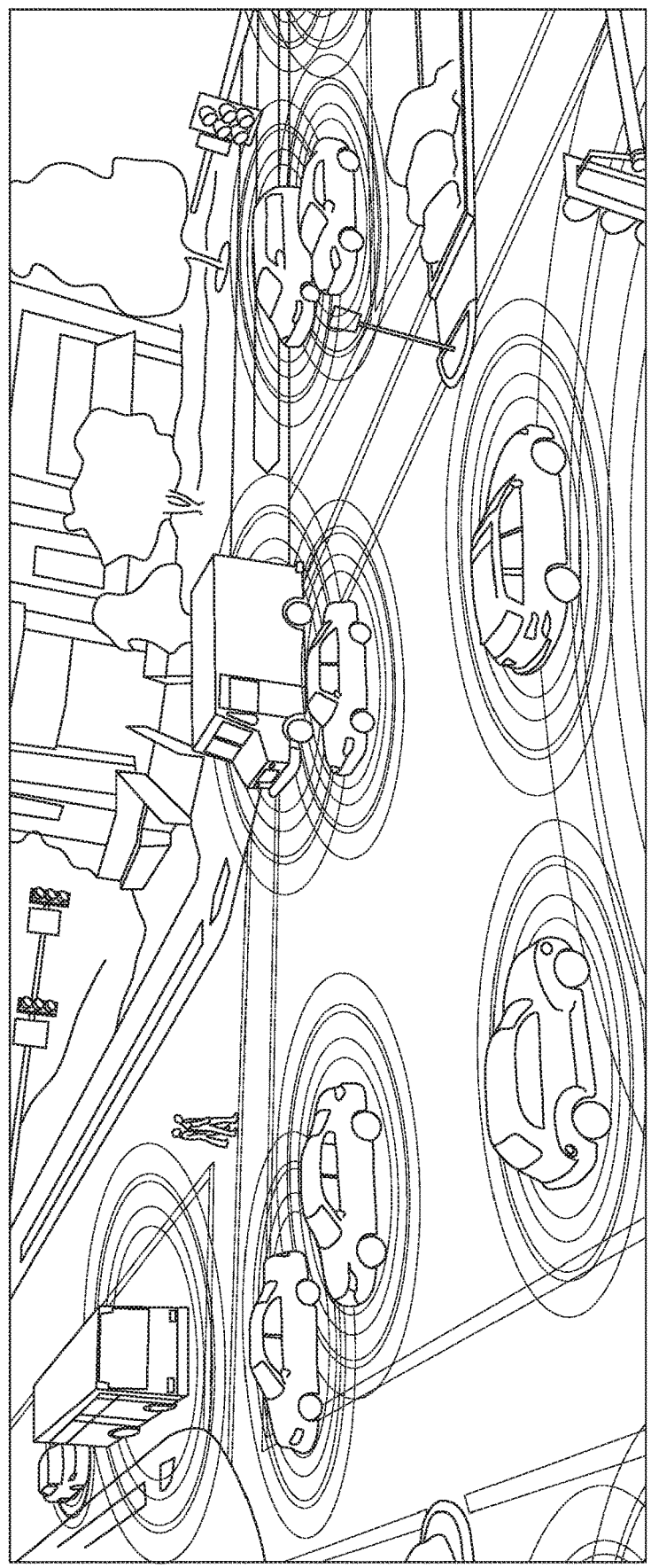
FIG. 1 is a diagram illustrating an example street scene incorporating several vehicles equipped with automotive radar sensor units.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Considering the use of radar for automotive applications, vehicle manufacturers can currently make use of four frequency bands at 24 GHz and 77 GHz with different bandwidths. While the 24 GHz ISM band has a maximum bandwidth of 250 MHz, the 76-81 GHz ultrawideband (UWB) offers up to 5 GHz. A band with up to 4 GHz bandwidth lies between the frequencies of 77 to 81 GHz. It is currently in use for numerous applications. Note that other allocated frequencies for this application include 122 GHz and 244 GHz with a bandwidth of only 1 GHz. Since the signal bandwidth determines the range resolution, having sufficient large bandwidth is important in radar applications.

Figure 2:
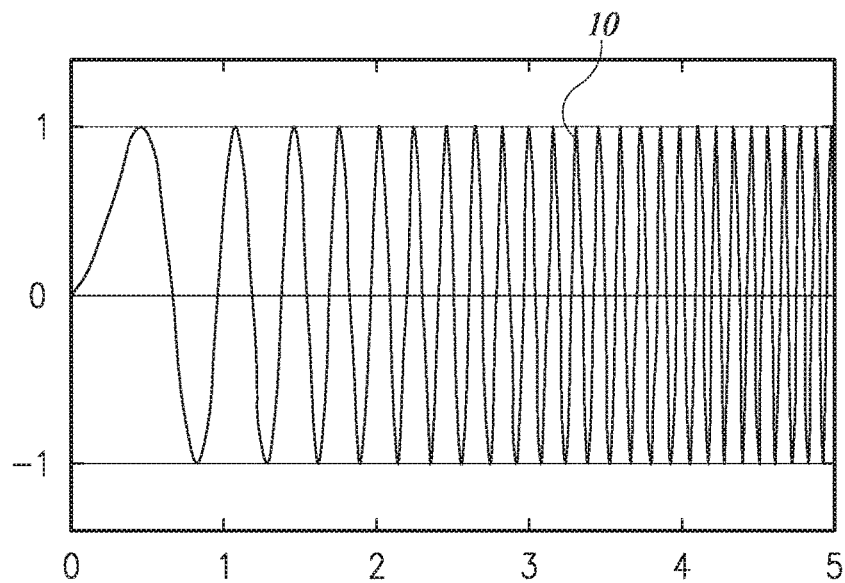
FIG. 2 is a diagram illustrating an example CW radar chirp waveform.
Figure 3:
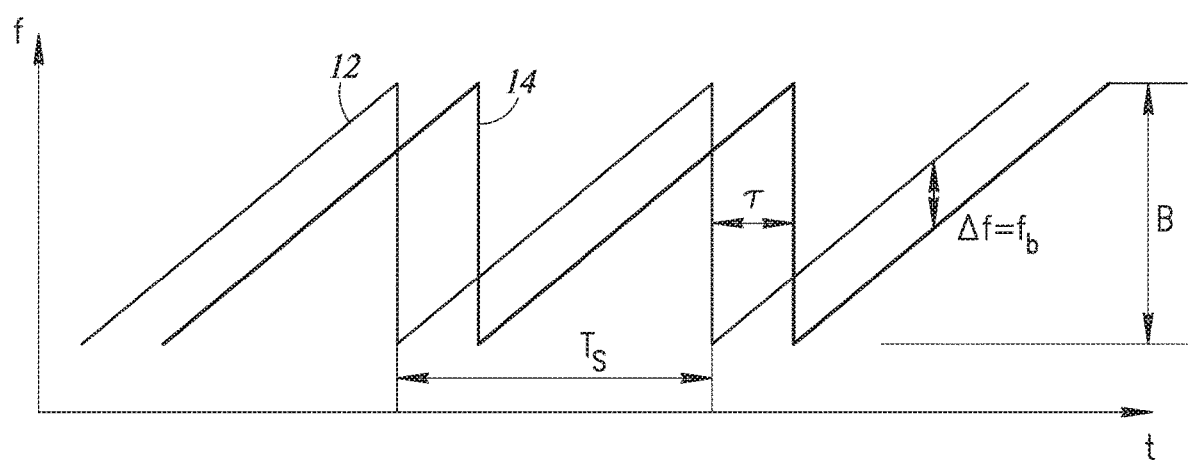
FIG. 3 is a diagram illustrating an example transmitted chirp and received reflected signal.

Frequency modulated continuous wave (FMCW) radars are radars in which frequency modulation is used. The theory of operation of FMCW radar is that a continuous wave with an increasing frequency is transmitted. Such a wave is referred to as a chirp. An example of a chirp waveform 10 is shown in FIG. 2. A transmitted wave after being reflected by an object is received by a receiver. An example of a transmitted 12 and received (i.e. reflected) 14 chirp waveform at the receiver is shown in FIG. 3.

Figure 4:
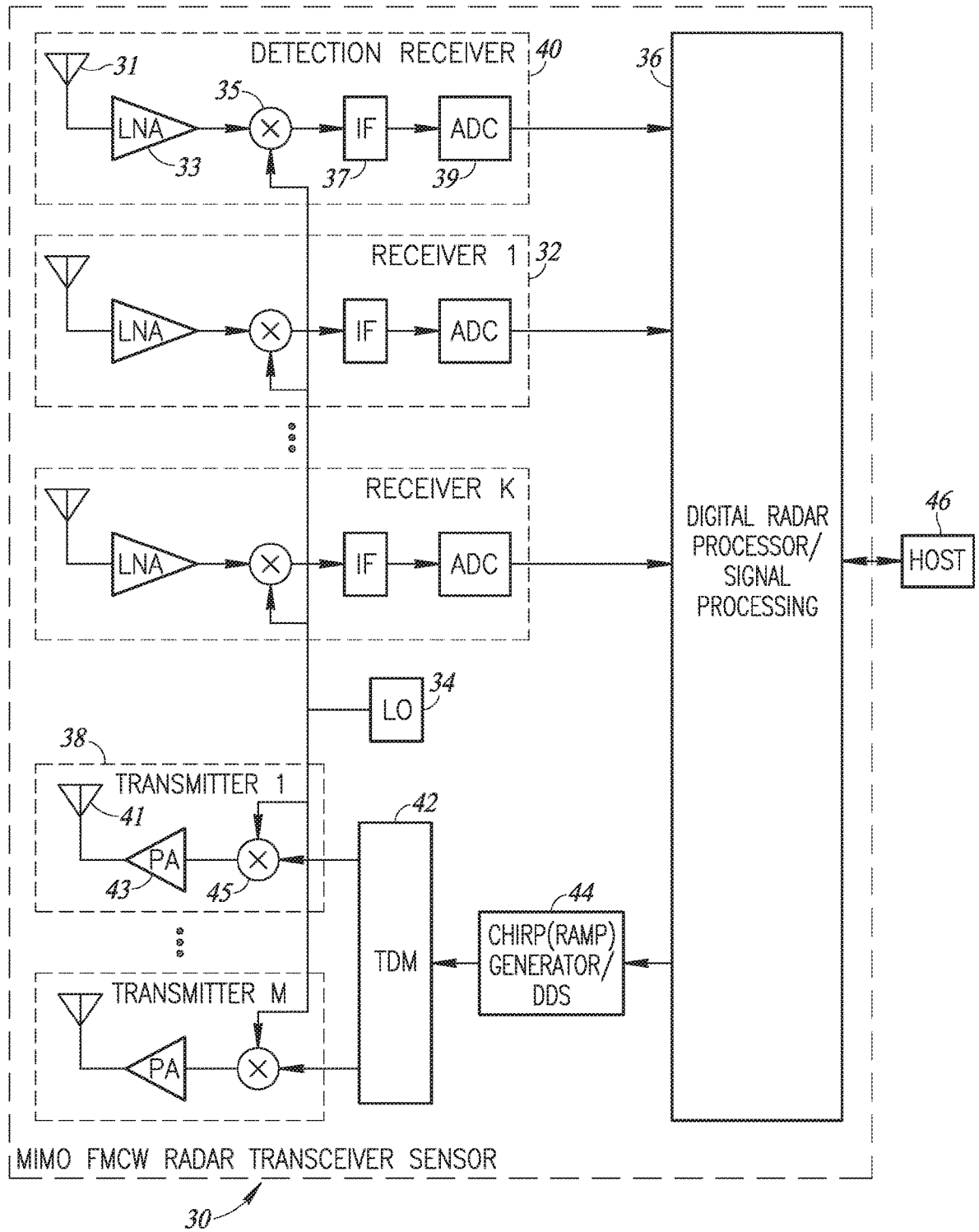
FIG. 4 is a high-level block diagram illustrating an example MIMO FMCW radar in accordance with the present invention.

A high level block diagram illustrating an example of MIMO FMCW radar in accordance with the present invention is shown in FIG. 4. The radar transceiver sensor, generally referenced 30, comprises a plurality of transmit circuits 38, a plurality of receive circuits 32, 40, local oscillator (LO) 34, ramp or chirp generator 44, e.g., direct digital synthesizer (DDS), and digital radar processor/signal processing block 36. In operation, the radar transceiver sensor typically communicates with and may be controlled by a host 46. Each transmit block comprises a mixer 45, power amplifier 43, and antenna 41. Each receive block 32, 40 comprises an antenna 31, low noise amplifier (LNA) 33, mixer 35, intermediate frequency (IF) block 37, and analog to digital converter (ADC) 39. In one embodiment, the radar sensor 30 comprises a separate detection wideband receiver 40 dedicated to listening. The sensor uses this receiver to detect the presence of in band interfering signals transmitted by nearby radar sensors. The processing block uses knowledge of the detected interfering signals to formulate a response (if any) to mitigate and avoid any mutual interference.

Digital radar processor/signal processing block 36 may comprise as any suitable electronic device capable of processing, receiving, or transmitting data or instructions. For example, the signal processing block may include one or more of: a microprocessor, a central processing unit (CPU), an application-specific integrated circuit (ASIC), field programmable gate array (FPGA), a digital signal processor (DSP), graphical processing unit (GPU), or combinations of such devices. As described herein, the terms "digital radar processor" or "processor" are meant to encompass a single processor or processing unit, multiple processors, multiple processing units, or other suitably configured computing element or elements.

For example, the processor may comprise one or more general purpose CPU cores and optionally one or more special purpose cores (e.g., DSP core, floating point, etc.). The one or more general purpose cores execute general purpose opcodes while the special purpose cores execute functions specific to their purpose.

Attached or embedded memory comprises dynamic random access memory (DRAM) or extended data out (EDO) memory, or other types of memory such as ROM, static RAM, flash, and non-volatile static random access memory (NVSRAM), removable memory, bubble memory, etc., or combinations of any of the above. The memory stores electronic data that can be used by the device. For example, a memory can store electrical data or content such as, for example, radar related data, audio and video files, documents and applications, device settings and user preferences, timing and control signals or data for the various modules, data structures or databases, and so on. The memory can be configured as any type of memory.

Transmitted and received signals are mixed (i.e. multiplied) to generate the signal to be processed by the signal processing unit 36. The multiplication process generates two signals: one with a phase equal to the difference of the multiplied signals, and the other one with a phase equal to the sum of the phases. The sum signal is filtered out and the difference signal is processed by the signal processing unit. The signal processing unit performs all the required processing of the received digital signals and controls the transmitted signal as well. Several functions performed by the signal processing block include determining range, velocity (i.e. Doppler), elevation, azimuth performing interference detection, mitigation and avoidance, performing simultaneous locating and mapping (SLAM), etc.

Figure 5:
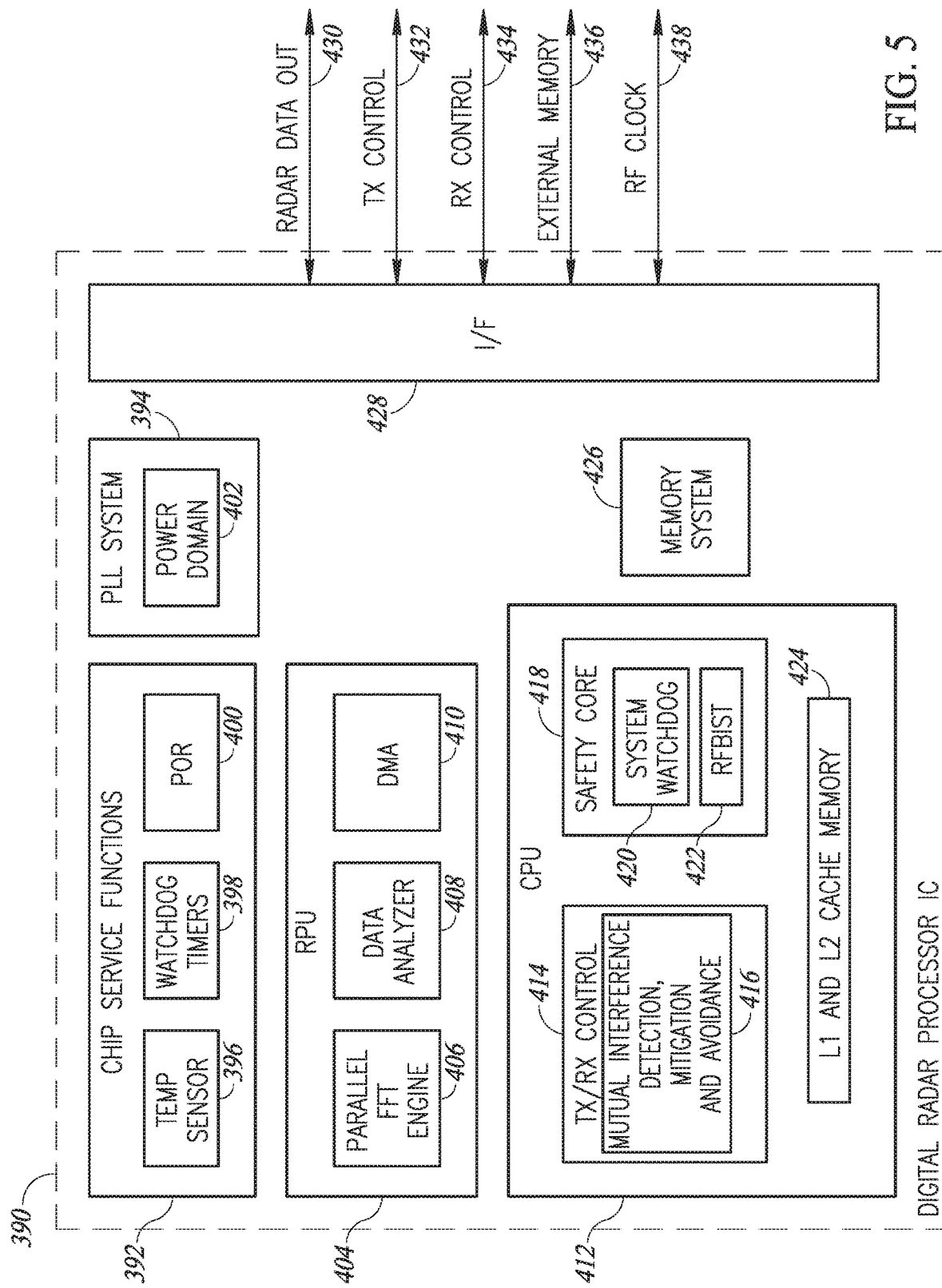
FIG. 5 is a block diagram illustrating an example digital radar processor IC of the present invention.

A block diagram illustrating an example digital radar processor IC of the present invention is shown in FIG. 5. The radar processor IC, generally referenced 390, comprises several chip service functions 392 including temperature sensor circuit 396, watchdog timers 398, power on reset (POR) circuit 400, etc., PLL system 394 including power domain circuit 402, radar processing unit (RPU) 404 including parallel FFT engine 406, data analyzer circuit 408 and direct memory access (DMA) circuit 410, CPU block 412 including TX/RX control block 414, safety core block 418, and L1 and L2 cache memory circuit 424, memory system 426 and interface (I/F) circuit 428.

The TX/RX control circuit 414 incorporates mutual interference detection, mitigation, and avoidance block 416 which implements the mechanism of the present invention. The safety core block 418 includes system watchdog timer circuitry 420 and optional RFBIST circuit adapted to implement an RFBIST mechanism. The I/F circuit includes interfaces for radar output data 430, TX control 432, RX control 434, external memory 436, and RF clock 438.

Note that the digital radar processor circuit 390 can be implemented on monolithic silicon or across several integrated circuits, depending on the particular implementation.

Similarly, the transmitter and receiver circuits can be implemented on a single IC or across several ICs depending on the particular implementation.

Note that FMCW radar offers many advantages compared to the other types of radars. These include (1) the ability to measure small ranges with high accuracy; (2) the ability to simultaneously measure the target range and its relative velocity; (3) signal processing can be performed at relatively low frequency ranges, considerably simplifying the realization of the processing circuit; (4) functioning well in various types of weather and atmospheric conditions such as rain, snow, humidity, fog and dusty conditions; (5) FMCW modulation is compatible with solid-state transmitters, and moreover represents the best use of output power available from these devices; and (6) having low weight and energy consumption due to the absence of high circuit voltages.

When using radar signals in automotive applications, it is desired to simultaneously determine the speed and distance of multiple objects within a single measurement cycle. Ordinary pulse radar cannot easily handle such a task since based on the timing offset between transmit and receive signals within a cycle, only the distance can be determined. If speed is also to be determined, a frequency modulated signal is used, e.g., a linear frequency modulated continuous wave (FMCW) signal. A pulse Doppler radar is also capable of measuring Doppler offsets directly. The frequency offset between transmit and receive signals is also known as the beat frequency. The beat frequency has a Doppler frequency component $f_D$ and a delay component $f_T$. The Doppler component contains information about the velocity, and the delay component contains information about the range. With two unknowns of range and velocity, two beat frequency measurements are needed to determine the desired parameters. Immediately after the first signal, a second signal with a linearly modified frequency is incorporated into the measurement.

Determination of both parameters within a single measurement cycle is possible with FM chirp sequences. Since a single chirp is very short compared with the total measurement cycle, each beat frequency is determined primarily by the delay component $f_T$. In this manner, the range can be ascertained directly after each chirp. Determining the phase shift between several successive chirps within a sequence permits the Doppler frequency to be determined using a Fourier transformation, making it possible to calculate the speed of vehicles and other moving objects. Note that the speed resolution improves as the length of the measurement cycle is increased.

Multiple input multiple output (MIMO) radar is a type of radar which uses multiple TX and RX antennas to transmit and receive signals. Each transmitting antenna in the array independently radiates a waveform signal which is different than the signals radiated from the other antennae. Alternatively, the signals may be identical but transmitted at nonoverlapping times one transmit element at a time. The reflected signals belonging to each transmitter antenna can be easily separated in the receive antennas since either (1) orthogonal waveforms are used in the transmission when transmitting simultaneously from all transmit elements, or (2) because they are received at nonoverlapping times from each transmit element separately. A virtual array is created that contains information from each transmitting antenna to each receive antenna. Thus, if there are an M number of transmit antennas and K number of receive antennas, then there will be M×K independent transmit and receive antenna pairs in the virtual array. This is achieved, however, using only M+K number of physical antennas. This characteristic of MIMO radar systems results in several advantages such as increased spatial resolution, increased antenna aperture, and higher sensitivity to improve the detection of slow moving objects.

As stated supra, signals transmitted from different TX antennas are orthogonal. Orthogonality of the transmitted waveforms can be obtained by using time division multiplexing (TDM), frequency division multiplexing (FDM), or spatial coding. In the examples and description presented herein, TDM is used which allows only a single transmitter to transmit at each time.

In the presence of mutual interference such as from other automotive radars, one interference suppression method is to shift the radar carrier frequency to a frequency range that is not contaminated by radar-to-radar interferences. This approach, however, has a problem in that it is usually difficult to find a free frequency band with sufficient bandwidth to operate for distributed radar sensor networks. It also requires the use of higher bandwidth antennas which are more difficult to design and manufacture.

Another interference suppression method removes all the signals, except for the interference, similar to switching off the transmitter, for subtraction from the original radar signal. This technique has the limitation that the peaks must be separated from, or at least not totally occupied by, the interference.

In another interference suppression method, an iterative filtering algorithm is first used to suppress the radar-to-radar interferences and then separately matched filtering for each radar is used.

Other interference suppression methods in the time or frequency domain include time-frequency blanking, reconstructing and then subtracting, and range domain orthogonal projection filtering. In a multistatic adaptive pulse compression algorithm, concurrently received radar signals within the same frequency band are separated given the knowledge of the individual radar waveforms. This algorithm is based on a recursive implementation of a minimum mean-square error formulation. An adaptive receive filter is estimated for each resolution cell of each received radar signal by utilizing the estimated values of the contemporaneous resolution cells. These methods, however, are not suitable for dealing with wideband or nonstationary interferences, particularly wideband radar-to-radar interferences that typically occur in distributed radar sensor networks.

Figure 6:
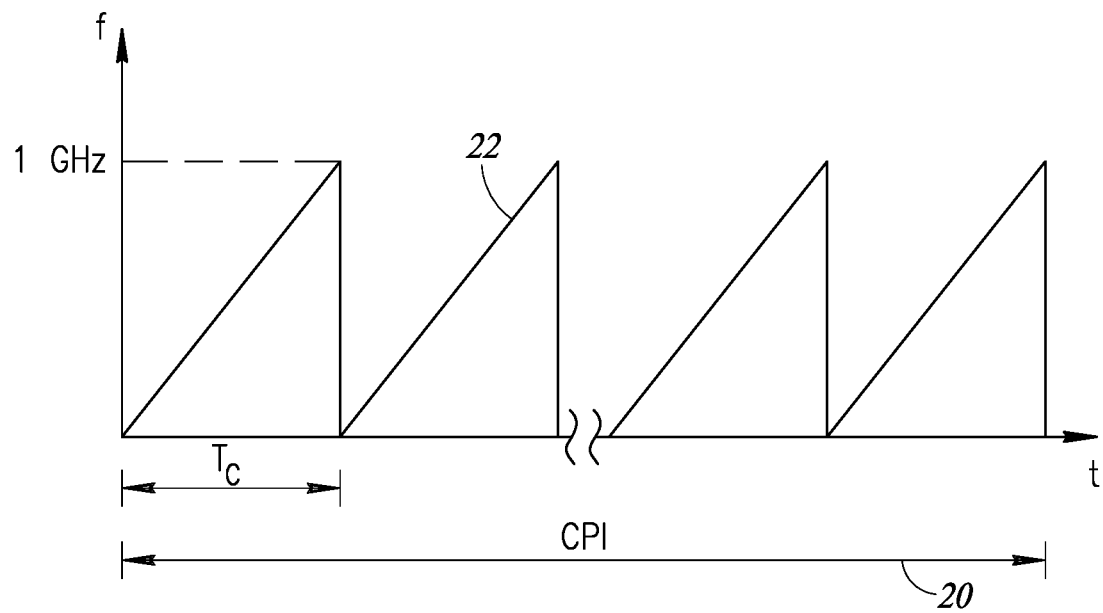
FIG. 6 is a diagram illustrating an example CPI with a plurality of chirps.

In another interference suppression method, the normally transmitted chirp is significantly reduced in bandwidth and duration. A diagram illustrating an example CPI with a plurality of chirps is shown in FIG. 6. A plurality of chirps 22, each of duration $T_C$ and having a bandwidth (1 GHz in the example presented herein) are transmitted during the coherent processing interval (CPI) 20.

Figure 7:
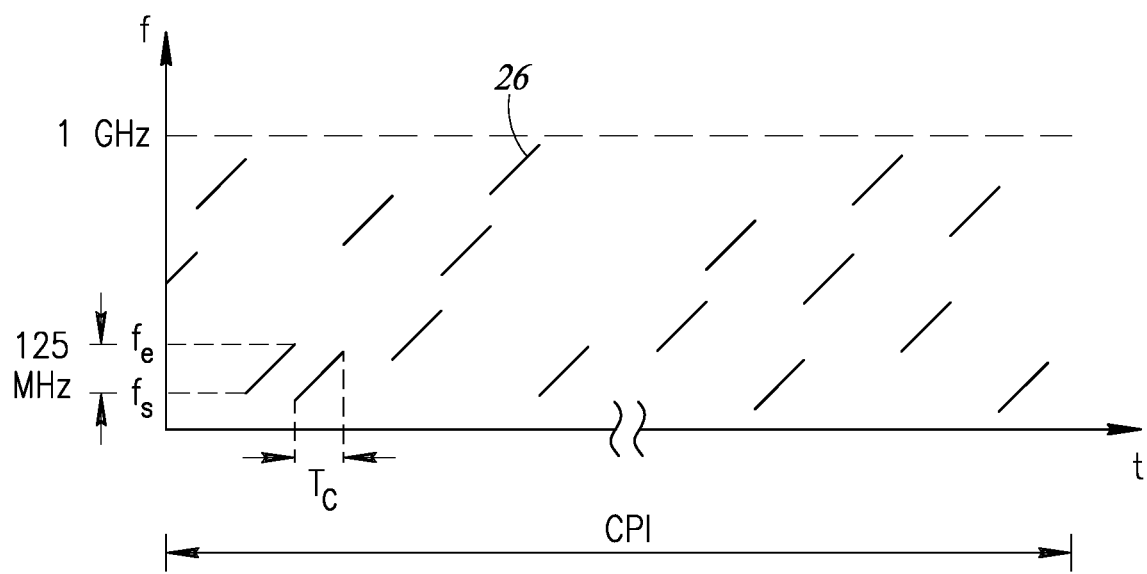
FIG. 7 is a diagram illustrating an example CPI with a plurality of randomized chirps.

In one embodiment, in an effort to mitigate mutual interference as well as to improve the decoupling of the Doppler processing and reduce the sample rate required in the IF stage, the individual transmitted chirps are reduced in bandwidth and duration as shown in FIG. 7. Each chirp 26 has a shorter duration $T_C$ and a smaller bandwidth. In this example, the bandwidth of each chirp is reduced from 1 GHz to 125 MHz. Each chirp has a starting frequency $f_s$ and an ending frequency $f_e$. Although no chirps within a CPI overlap in time, they can overlap in frequency. Thus, considering the frequency range between 80-81 GHz, the start frequencies of two chirps, for example, may be 80.11 GHz and 80.12 GHz with each chirp having a bandwidth of 125 MHz.

In another embodiment, to improve processing gain and to mitigate interference, the starting frequency of each chirp is randomized over the CPI or some other desired interval. Preferably, the randomized sequence covers the entire bandwidth, e.g., 1 GHz in this example.

As an illustrative example, consider a radar sensor having an aggregate bandwidth of 1 GHz which translates to a range resolution of 15 cm, a coherent processing interval (CPI) of 20 ms, and a chirp duration $T_C$ of 6 microseconds. This yields a chirp sequence of $CPI/T_C$=3,333 chirps. If it is assumed that each chirp has a bandwidth of 125 MHz and that the allocated RF band extends from 80 to 81 GHz, the start frequencies of the chirps must be in the range 80 to 80.875 GHz, otherwise the chirps spill over the allocated range.

Next, the 80 to 80.875 GHz frequency band is divided into 3,333 evenly spaced starting frequencies $f_s$. Next, the 3,333 start frequencies are randomly reordered and used to transmit the sequence of chirps. Note that the randomization is used to break the coupling between Doppler induced and range induced phase evolution from one chirp to the next. This is commonly referred to as slow time phase or video phase. If a chirp sequence is transmitted with monotonically increasing start frequency ordering, it would be virtually impossible to determine whether the video phase evolution stems from range or Doppler. Thus, a form of 'frequency hopping' or 'chirp hopping' is applied to the chirps. The hopping pattern is randomized over the CPI but is not limited to this and may be randomized over other time periods.

Figure 8:
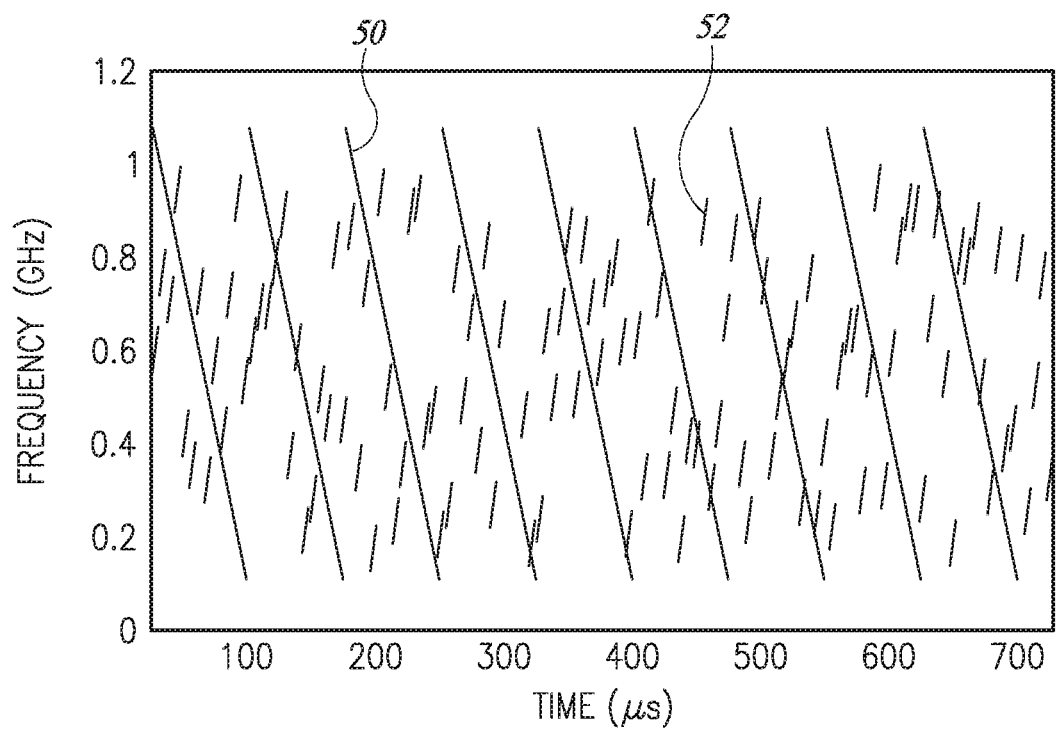
FIG. 8 is a diagram illustrating an example victim view.

A diagram illustrating an example victim view is shown in FIG. 8. This spectrogram (i.e. frequency versus time along with power as color shading) shows example slow, high bandwidth chirps 50 of a nearby interfering radar and the fast, small bandwidth sub-chirps of the victim radar 30 (FIG. 4) incorporating the mechanism of the present invention. In this example, the victim radar transmits upward chirps (positive slope) and the interfering radar transmits downward chirps (negative slope). Shown is the random hopping of the shorter chirps of the victim radar 30 compared to the regular long chirps of the interfering radar. Interference occurs when a long downward sloping chirp 50 crosses a short forward sloping chirp 52 which occurs in numerous locations in the spectrogram of FIG. 8.

Note that it is evident from the spectrogram of FIG. 8 that even without the use of any interference avoidance techniques, some of the interfering radar chirps do not interfere with the victim radar chirps at all. Thus, a much better situation is achieved compared to the radar 30 using conventional long chirps 12 (FIG. 3) that span the full band (e.g., 1 GHz in this example). In the case of full 1 GHz chirps, crossing (i.e. collisions) between the two radars would be inevitable, unless the radars are synchronized. Note also that avoidance techniques in this case would only work if the two radars have similar slopes and do not overlap in time. Such an avoidance technique, however, would only work for a one-on-one situation. Avoiding two or more other radars with different slopes would be virtually impossible.

Figure 9:
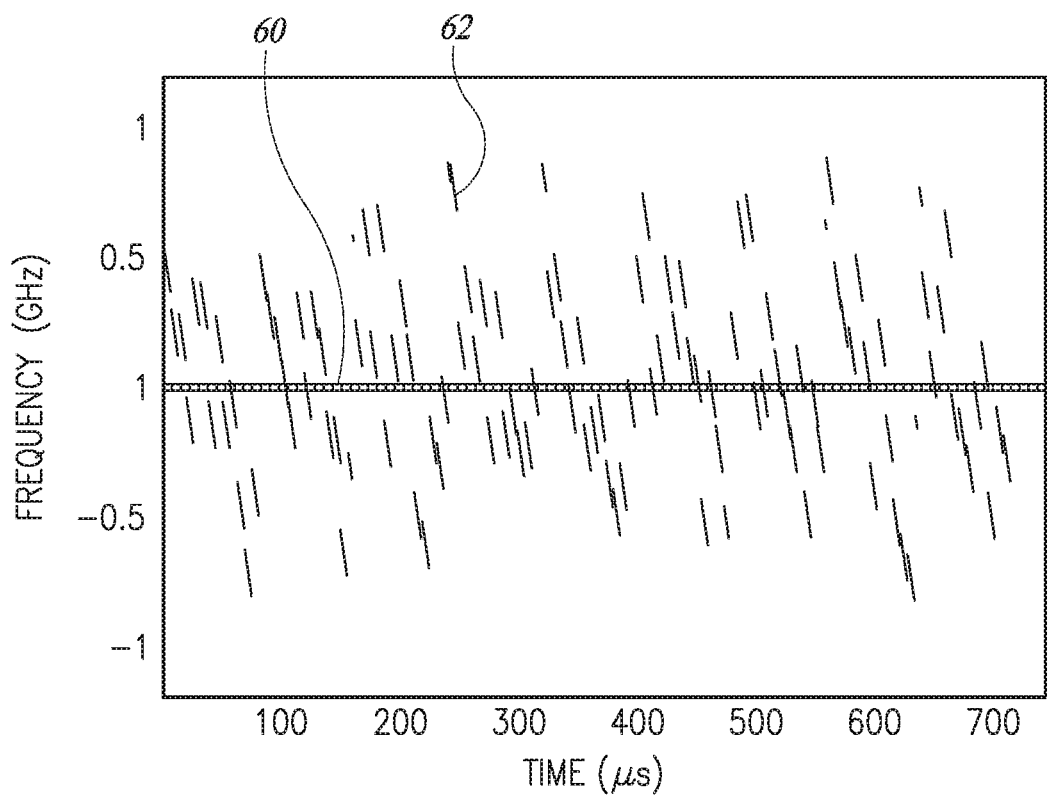
FIG. 9 is a diagram illustrating an example victim view after deramping.

A diagram illustrating an example victim view after deramping is shown in FIG. 9. This spectrogram (i.e. frequency versus time along with power as color shading) shows the spectrogram of FIG. 8 post deramping process including the victim radar 30 desired signal 60 and the interfering radar signal 62. Note that during processing by the victim radar 30, the chirp transmitted by the interfering radar is chopped during the chirp reassembly process of the victim radar. Note also that the interference to the victim radar occurs around zero frequency and within the IF bandwidth of 12 MHz where any of the lines 62 cross line 60.

Figure 10:
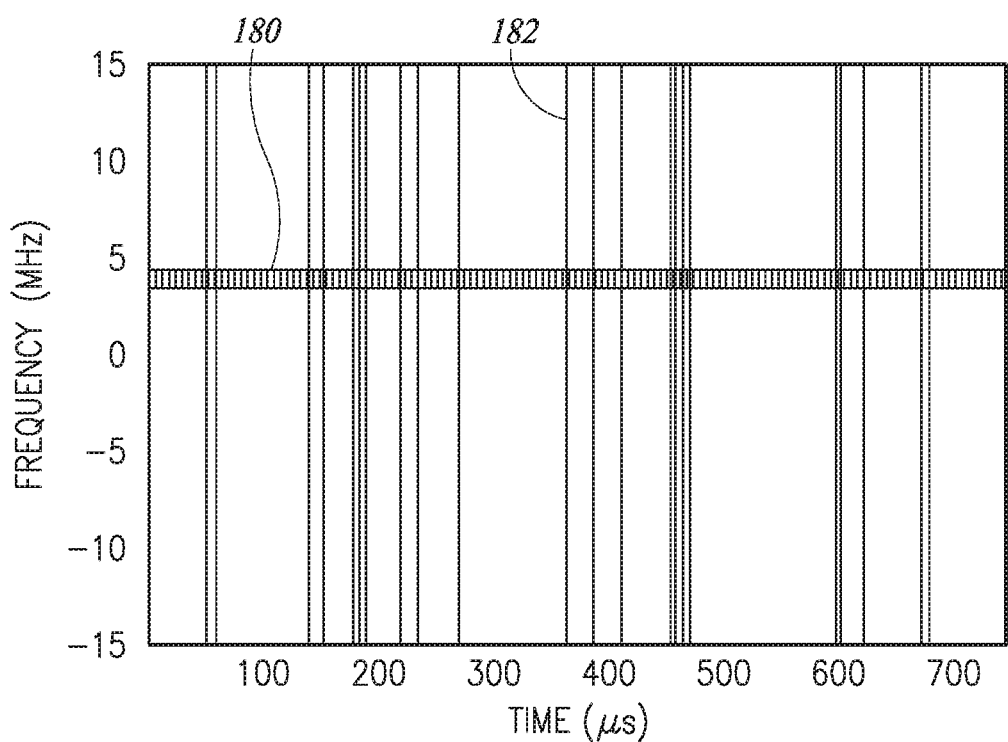
FIG. 10 is a diagram illustrating an example victim view after deramping and low pass filtering.

A diagram illustrating an example victim view after deramping and low pass filtering is shown in FIG. 10. The spectrogram shown here is of the victim's radar baseband signal with interference after deramping and low pass filtering. The dashed straight line 180 at approximately 4 MHz represents multiple chirps of the victim radar 30 while the vertical lines 182 represent the interference from the interfering radar. Each line 182 that crosses line 180 represents interference to the victim radar 30.

Figure 11:
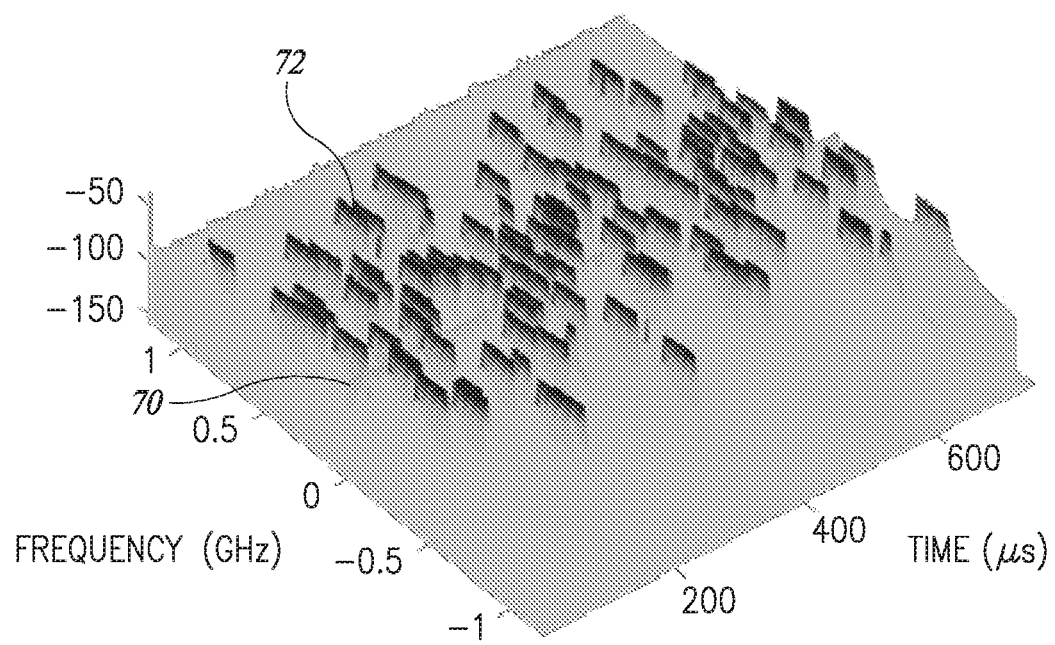
FIG. 11 is a diagram illustrating an example 3D victim view after deramping.

A diagram illustrating an example 3D victim view after deramping is shown in FIG. 11. This spectrogram is the same as the spectrogram of FIG. 9 but with a different point of view with interference level shown by height in dBs. Note that the interfering radar's chopped chirps 72 are approximately 30 dB above the desired signal 70. Note also that the victim radar 30 suffers interference only where interference lines 72 cross line 70.

Figure 12:
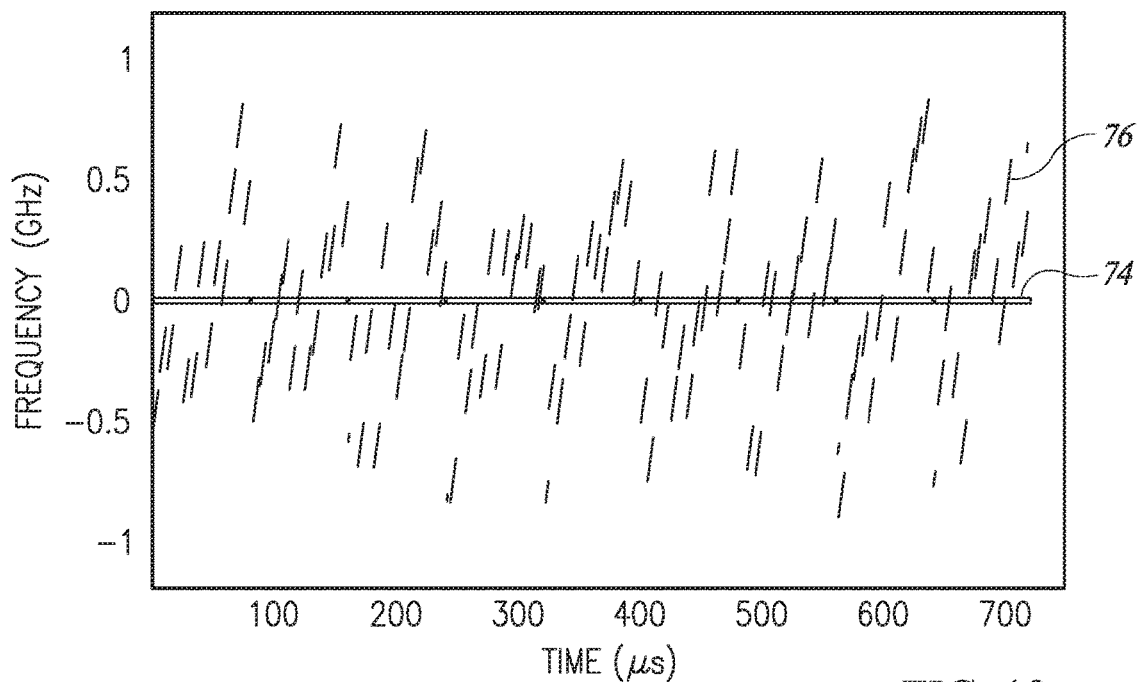
FIG. 12 is a diagram illustrating an example interferer view after deramping.

A diagram illustrating an example interferer view after deramping is shown in FIG. 12. This spectrogram represents what the interfering radar sees. The radar 30 of the present invention is considered the victim. Accordingly, short sloping lines 76 represent the hopping chirp pattern as seen by the interfering radar and line 74 around zero frequency represents the deramped interferer's desired signal. Here, the interferer's radar suffers interference only when one of the lines 76 crosses line 74.

Thus, as described supra, in the absence of interference, the randomized unconstrained order sequence for transmitting the chirps is sufficient and achieves good results. In the presence of interference with known parameters, however, the randomization alone is not sufficient to prevent the receiver from suffering from interference due to 'collisions' between the chirp signals from nearby radars, i.e. the interfering chirp signal entering the IF of the victim's receiver.

To overcome this, the radar sensor of the present invention places a constraint on the randomization process. The constraint is that after randomization none of the chirps overlap the interference signal in the time-frequency domain. This technique can be implemented in any suitable manner depending on the particular application.

Figure 13:
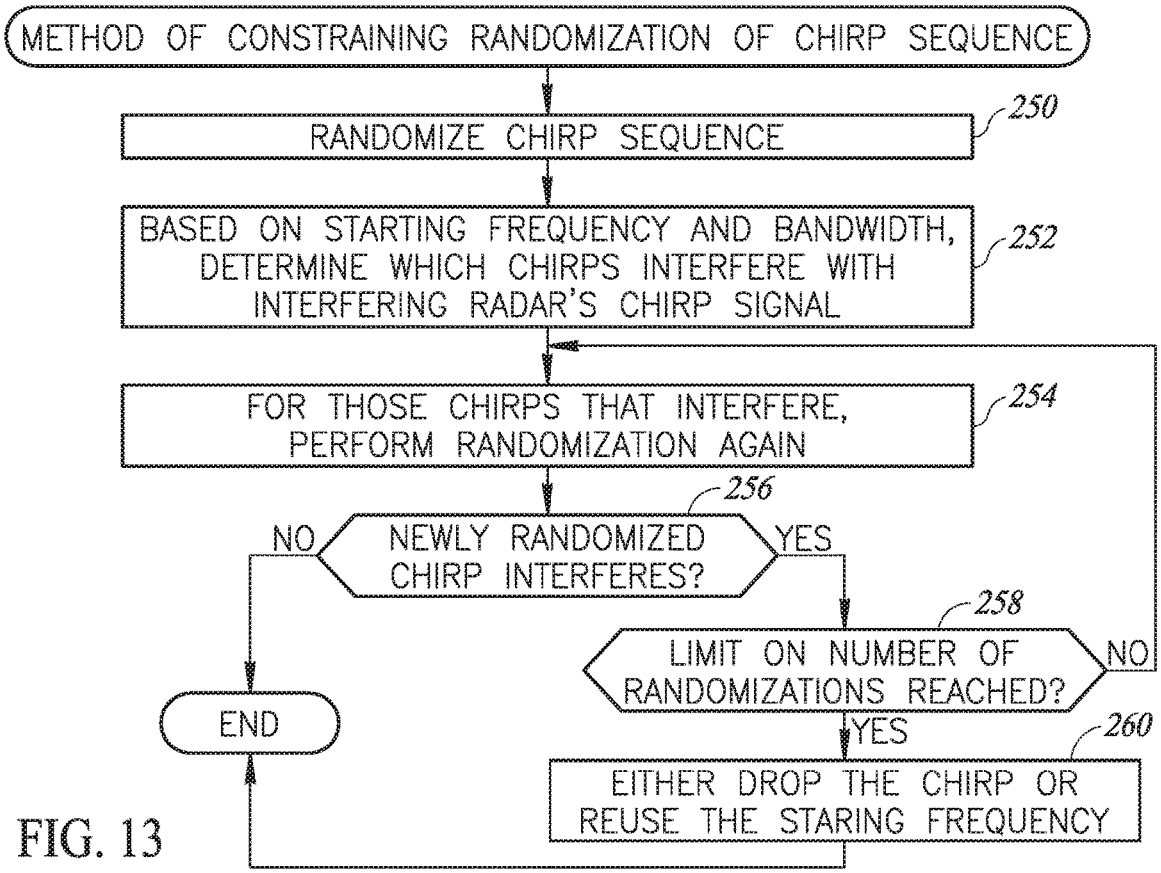
FIG. 13 is a flow diagram illustrating an example method of constraining randomization of the chirp sequence in accordance with the present invention.

A flow diagram illustrating an example method of constraining randomization of the chirp sequence in accordance with the present invention is shown in FIG. 13. In one embodiment, after randomization of the chirp sequence (step 250), the chirp intervals are examined to see whether they would collide with the interferer signal (step 252). This can be determined based on the known starting bandwidth of the chirp and its bandwidth. A list is constructed on the victim radar of all the chirps in the sequence that interfere. Each of these chirps are re-randomized (step 254) and checked again whether they overlap with the interferer signal (step 256). If so, they are re-randomized again. This process continues until either a new random interval is found that does not interfere with the interfering radar signal or a limit on the number of retries is reached (step 258). In the latter case, the original offending chirp is either thrown away (i.e. nothing is transmitted in its place), or one of the non-interfering chirps is repeated (i.e. the starting frequency is reused) (step 260).

Figure 14:
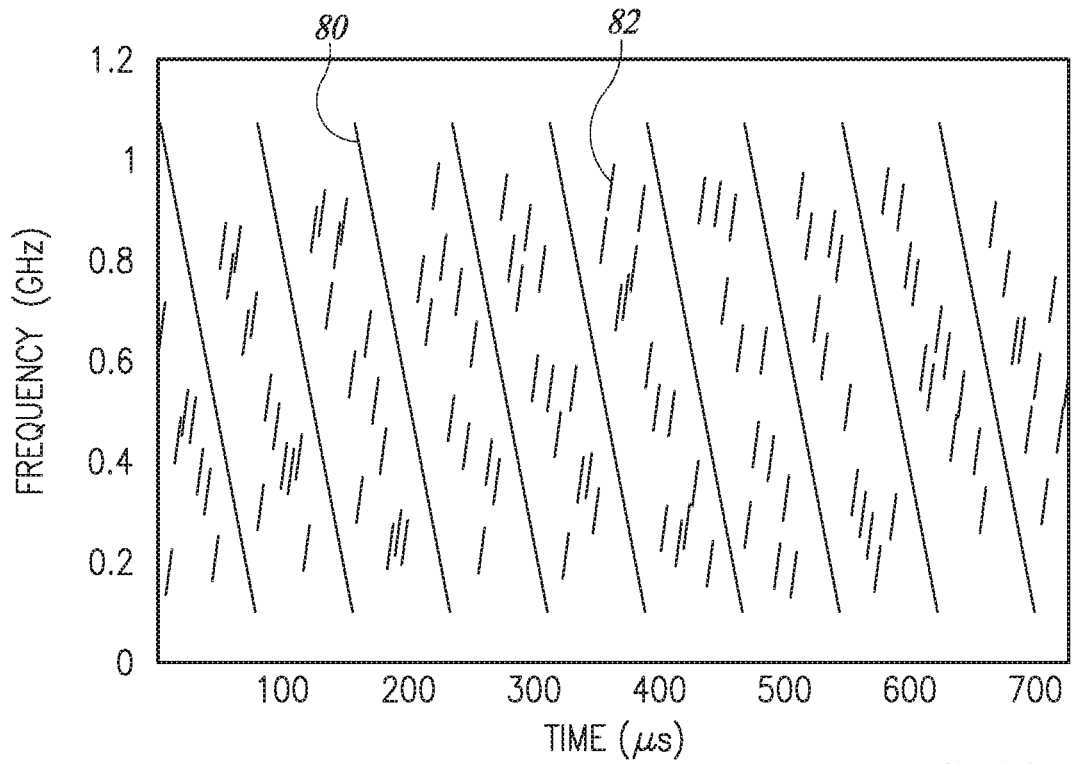
FIG. 14 is a diagram illustrating an example victim view after interference detection and avoidance.

A diagram illustrating an example victim radar view after interference detection and avoidance is shown in FIG. 14. In one embodiment, the victim radar 30 is able to mitigate and avoid the mutual interference shown in the spectrograms described supra. Using the detection capability provided by the detection receiver 40 (FIG. 4), the radar 30 functions to detect and estimate the other interfering radar's chirp parameters, such as bandwidth, duration, timing, etc.

In one embodiment, this can be achieved by the dedicated detection receiver sampling the total RF bandwidth its antenna sees with a relatively fast ADC. Alternatively, periodic full chirps are used (i.e. 'stolen') in listening mode (e.g., using look through or a separate LO).

Once the interfering radar's chirp characteristics are estimated, the victim radar 30 alters the starting frequencies of the chirps so as to avoid interference with the chirps of other interfering radars. An example of the result of the alteration is shown in the spectrogram of FIG. 14 where the victim radar 30 chirps 82 are now depicted not crossing any of the interfering radar chirps 80. This reduction in interference is to be compared to the spectrogram of FIG. 8 which represents the victim radar view without the mitigation technique of the present invention.

Note that the radar 30 can be configured to either (1) alter the start frequency of each chirp thereby creating custom start frequencies of each chirp or only selected chirps that are estimated to collide with the interferer's chirps; (2) maintain the original start frequencies of chirps but after randomizing the chirps, swap out chirp hop sequences that are estimated to collide with the interfering radar's chirps and replace them with one or more chirps that do not collide with the interferer's chirps and reassign the swapped out one or more chirps to one or more other time slots; or (3) a combination of the above two techniques.

In another embodiment, if interference is detected, the victim radar 30 can, in addition to altering the starting frequency of chirps, modify the sign of the slope of each chirp (i.e. whether each chirp rises or falls in frequency which is equivalent to positive or negative slope, respectively).

Figure 15:
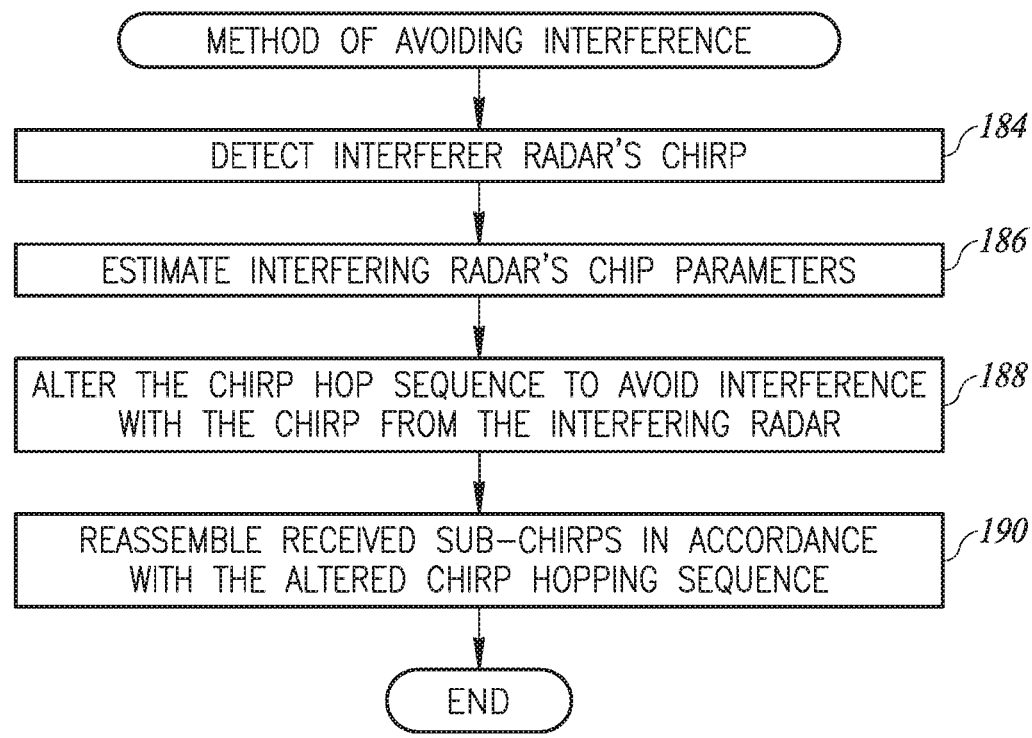
FIG. 15 is a flow diagram illustrating an example method of avoiding interference in accordance with the present invention.

A flow diagram illustrating an example method of avoiding interference in accordance with the present invention is shown in FIG. 15. The victim's radar first detects the interfering radar's chirp as described supra (step 184). The parameters of the interfering radar's chirp are then estimated (step 186). Based on the estimated parameters, the hop sequence for the victim radar's chirps is modified to avoid colliding with the interfering radar's chirp signal (step 188).

Figure 16:
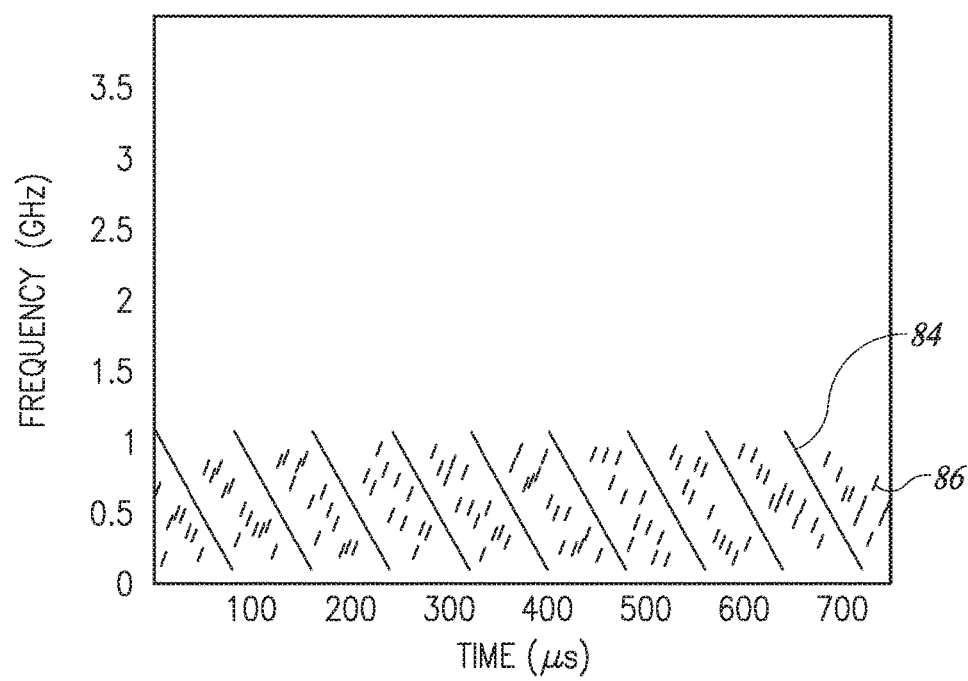
FIG. 16 is a diagram illustrating an example interferer view with interference detection and avoidance.

A diagram illustrating an example interferer view with interference detection and avoidance is shown in FIG. 16. In this spectrogram, the interfering radar's chirps 84 do not collide with the randomized and constrained chirps 86 of the victim radar. Note that preferably the maximum propagation delay between the two radars, as deemed appropriate given the nature of the automotive scene and what is considered an acceptable level of residual mutual interference, is taken into account.

Figure 17:
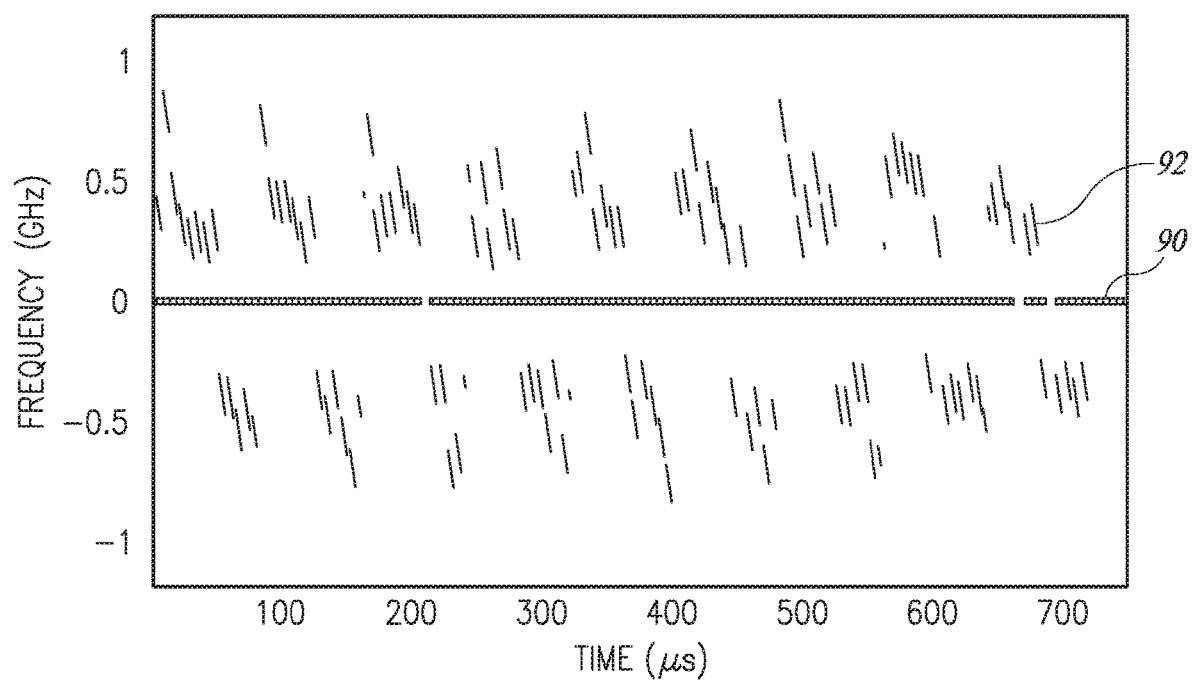
FIG. 17 is a diagram illustrating an example victim view with interference detection and avoidance post deramping.

A diagram illustrating an example victim view with interference detection and avoidance post deramping is shown in FIG. 17. In this spectrogram, the interfering radar's chirps 92 do not collide with the chirps 90 of the victim radar. Note the interference free zone around zero frequency. Note also, however, that several chirp intervals are empty. This is a result of the randomization constraint method which resulted in several chirps whose starting frequencies were not able to be reassigned. Rather than reuse starting frequencies, in this example the chirps were simply deleted (i.e. skipped and not transmitted). This reduction in interference is to be compared to the spectrogram of FIG. 9 which represents the victim radar view without the mitigation technique of the present invention.

Figure 18:
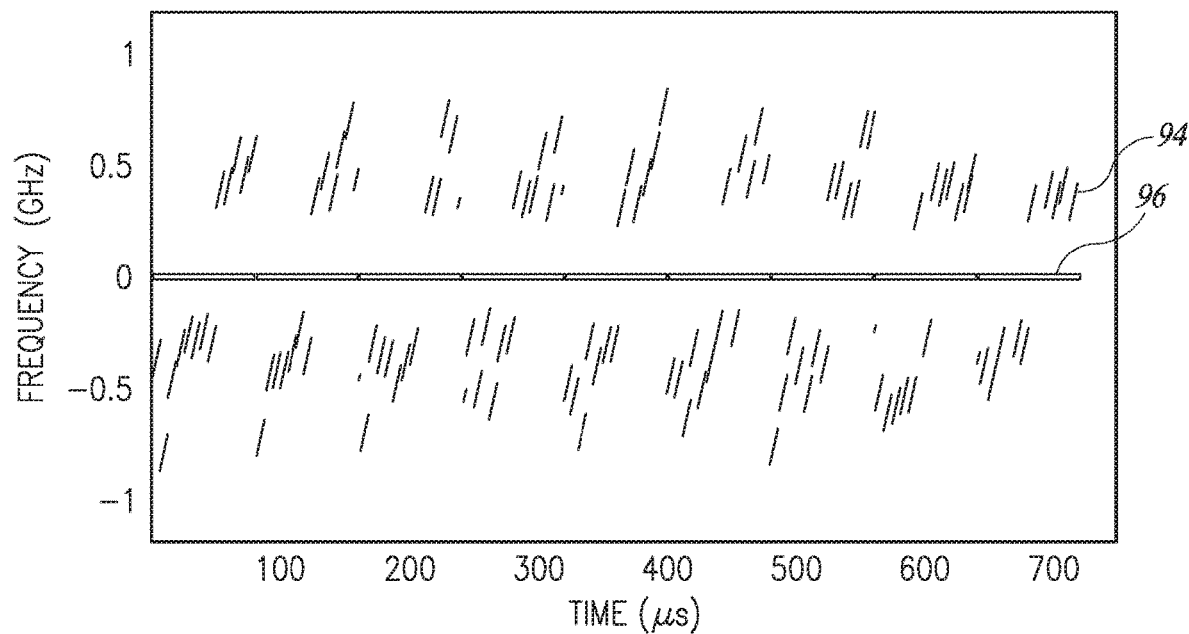
FIG. 18 is a diagram illustrating an example interferer view with interference detection and avoidance post deramping.

A diagram illustrating an example interferer view after interference detection and avoidance post deramping is shown in FIG. 18. In this spectrogram, the victim's chirps 96 do not collide with the chirps 94 of the interfering radar. Note the interference free zone around zero frequency. This reduction in interference is to be compared to the spectrogram of FIG. 11 which represents the victim radar view without the mitigation technique of the present invention.

Figure 19:
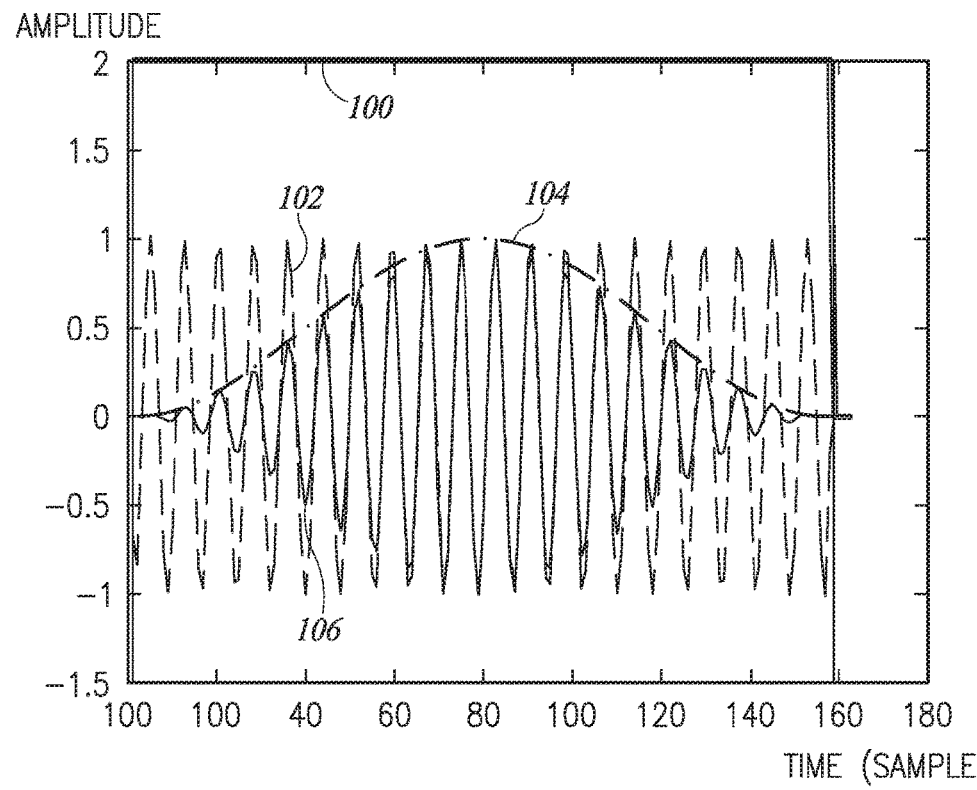
FIG. 19 is a diagram illustrating an example radar IF signal without interference.

A diagram illustrating an example radar IF signal without interference is shown in FIG. 19. Since no interference is present, the entire frame is valid and used as denoted by the blanking signal 100 that encompasses the entire frame. The radar signal without interference 102 is shown before windowing. A window (e.g., Hann) 104 is applied to the signal 102 resulting in the windowed signal 106. Note that in cases where avoidance mitigation fails or is impossible, a collision occurs.

Figure 20:
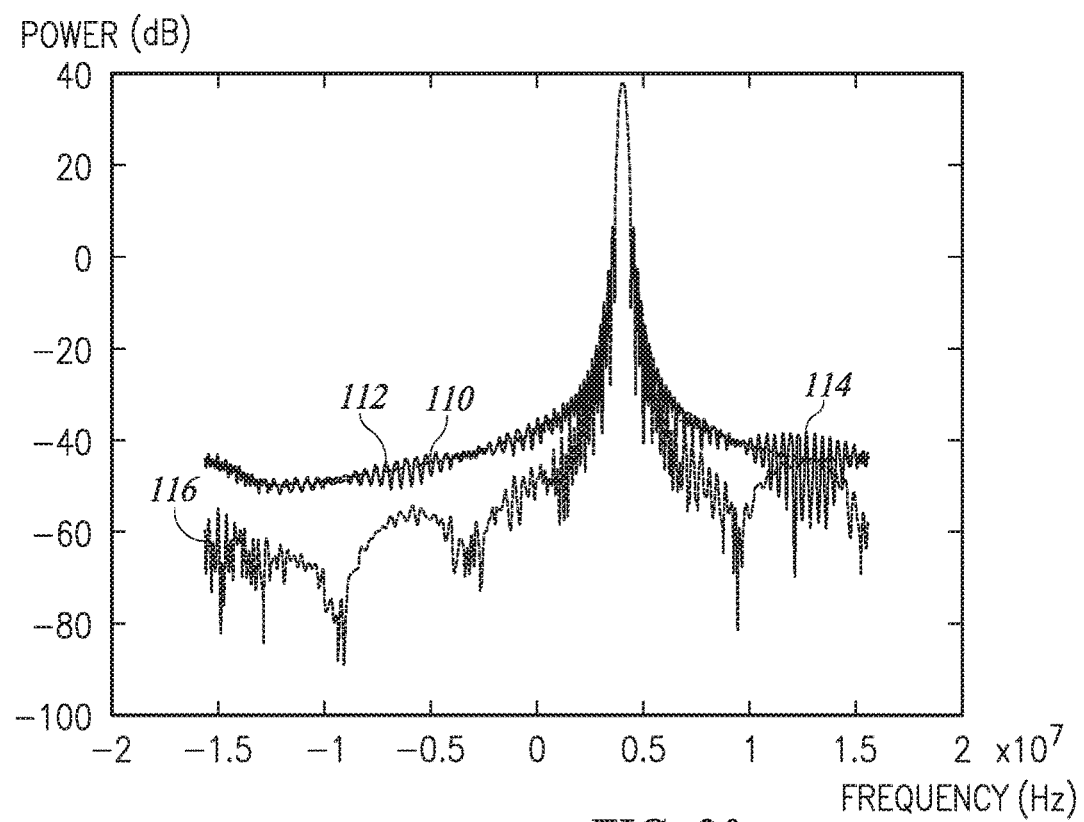
FIG. 20 is a diagram illustrating an example IF range spectrum with interference.

A diagram illustrating an example IF range spectrum with interference is shown in FIG. 20. The fast Fourier transform (FFT) of the windowed signal 106 (FIG. 19) is shown with no interference (signal 110), with interference (signal 112), with rectangular blanking (signal 114), and with windowed blanking (signal 116). Note that FIGS. 19 and 20 provide a reference for FIGS. 21, 22, 23, 24, 25, and 26, described infra.

In addition to the victim's radar avoiding collisions with interfering radar's chirp signals, the radar of the present invention also provides the capability of mitigating interference by blanking the portion of the chirp that is corrupted by the interfering chirp signal (i.e. the collision region). Two examples are provided and discussed below. In the first example, the collision between the two signals (i.e. where the interfering chirp enters the IF of the victim's receiver) occurs near the beginning of the chirp. In the second example, the collision between the two signals occurs closer to the middle of the chirp.

In another embodiment, interference mitigation may include the victim radar ceasing its own transmissions as long as interference is detected. This serves to minimize the interference inflicted by the victim radar 30 on nearby radars whether they interfere with the victim or not.

Figure 21:
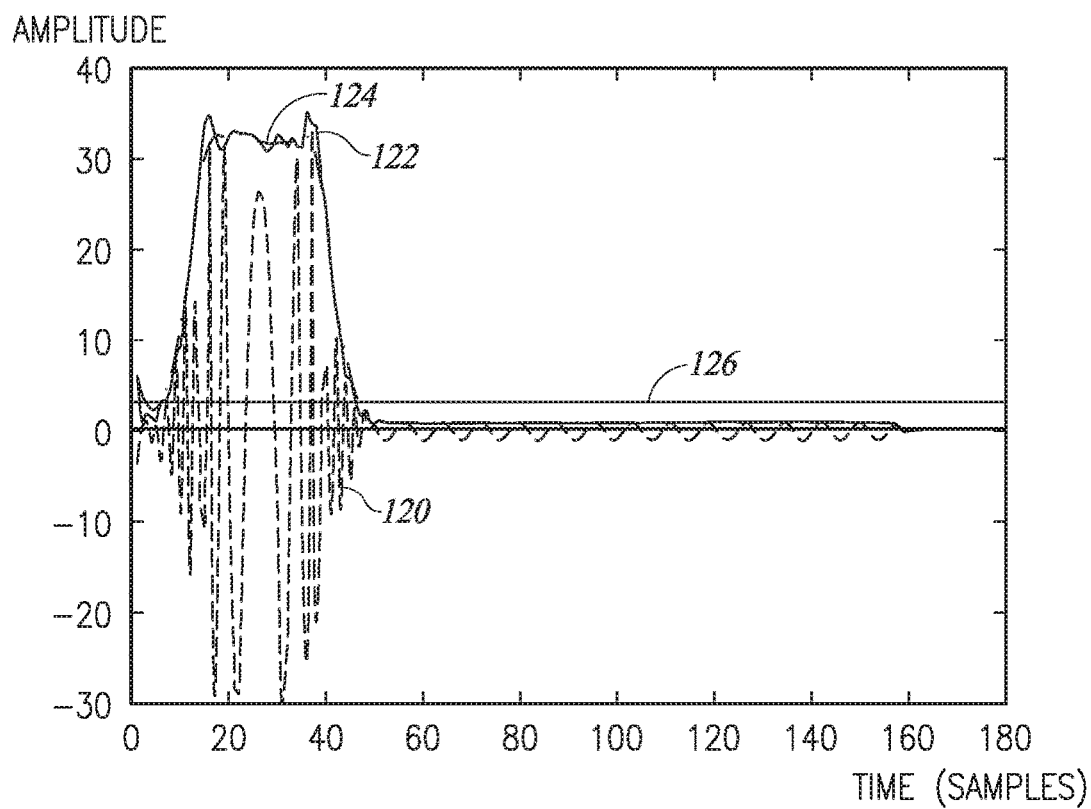
FIG. 21 is a diagram illustrating a first example time domain IF signal with interference.

A diagram illustrating a first example time domain IF signal with interference is shown in FIG. 21. In this example, the interference appears in the victim's radar IF bandwidth and occurs near the beginning of a chirp interval. The amplitude of the interference is approximately 30 dB stronger than the desired signal. To detect the interference, the envelope (e.g., complex envelope) of the signal is calculated and then smoothed. A threshold is then set at the 30% percentile plus some positive bias, for example. It is appreciated that other threshold values can be used depending on the particular implementation. Any interference detected (i.e. whenever the smoothed envelope exceeds the threshold) is filtered, e.g., by a median filter. Then areas where the desired signal is free of interference are identified, and each is multiplied by a window with matching length. Signal processing then proceeds as usual, e.g., range FFT calculation, Doppler FFT calculation, azimuth and/or elevation calculation, digital beam forming, etc.

Figure 27:
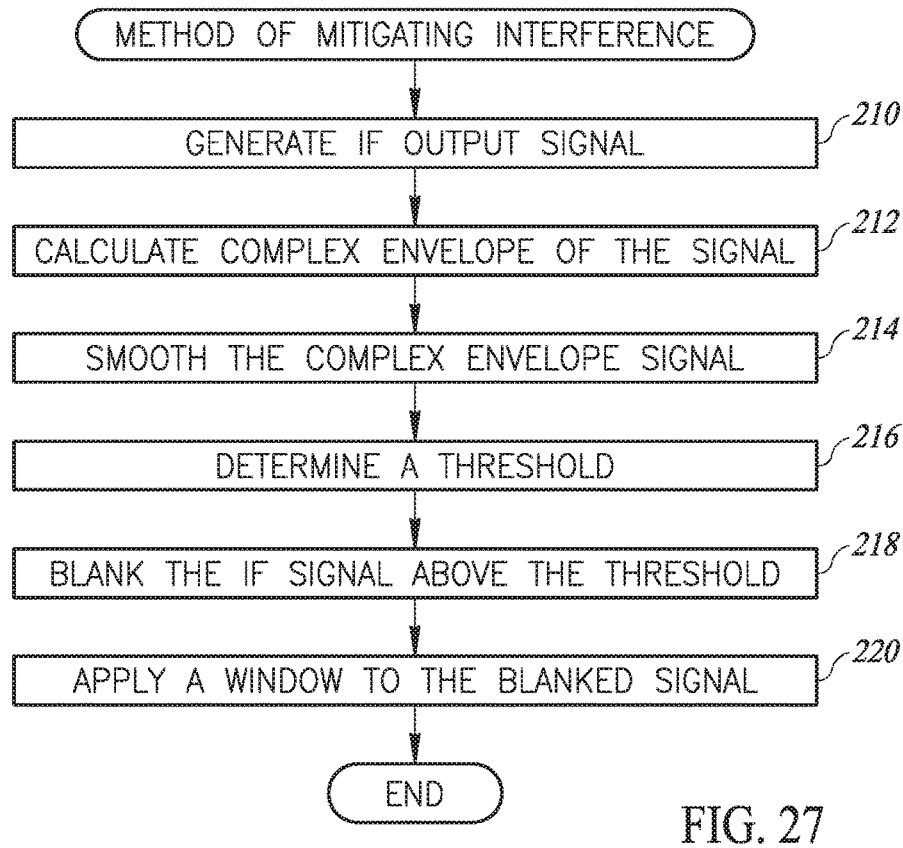
FIG. 27 is a flow diagram illustrating an example method of mitigating interference in accordance with the present invention.

A flow diagram illustrating an example method of mitigating interference in accordance with the present invention is shown in FIG. 27. First, an IF signal is generated (step 210). The complex envelope of the IF signal is calculated (step 212). The complex envelope is then smoothed using any suitable filer (step 214). A threshold to be applied to the smoothed complex envelope signal is determined using any suitable method (step 216). The threshold is applied whereby all values above the threshold are zeroed (i.e. blanked) (step 218). A window is then applied to the blanked signal (step 220).

In particular, with reference to FIG. 21, the time domain signal output of the IF stage (signal 120) of the victim radar is corrupted with the interferer's radar chirp. The complex envelope of the signal is calculated (signal 122) as well as a filtered or smoothed envelope (i.e. after low pass filtering) (signal 124). A threshold 126 is determined using any suitable method to apply to the smoothed envelope. Any part of the signal that is above the threshold is blanked (i.e. zeroed). Note that one method of determining the threshold is to calculate a percentile of the smoothed envelope value and add to it a positive bias.

Figure 22:
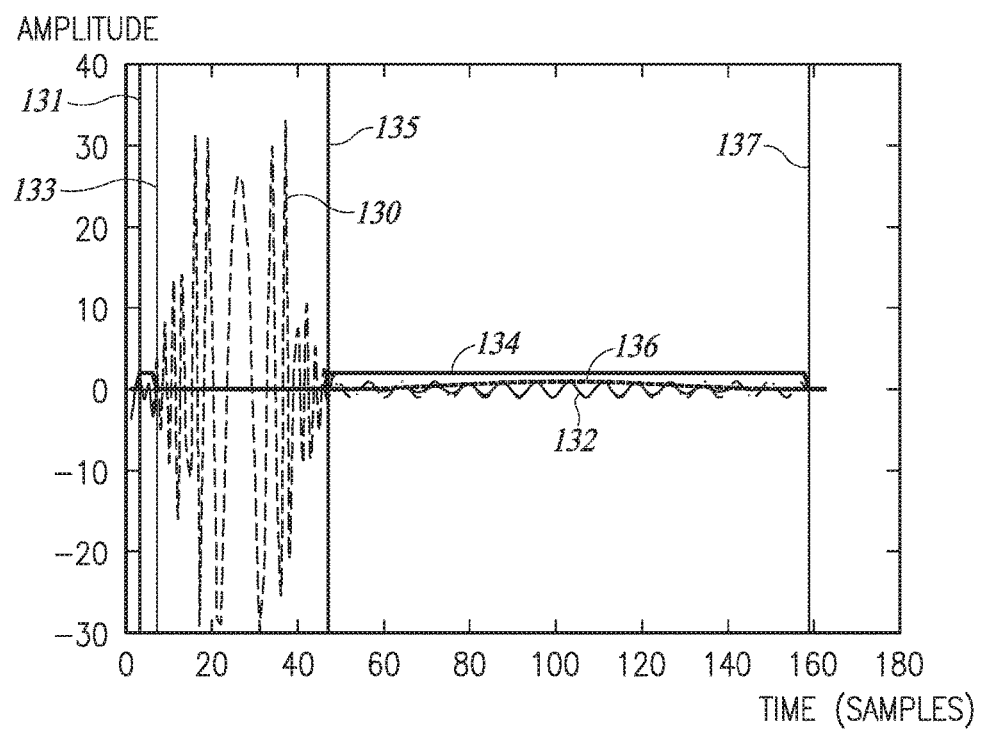
FIG. 22 is a diagram illustrating a first example time domain IF signal with interference before and after blanking.

A diagram illustrating a first example time domain IF signal with interference before and after blanking is shown in FIG. 22. The signal 130 is shown before blanking. A high level of the blanking signal 134 indicates portions of the signal that are valid and to be used while a low level represents those portions of the signal to be zeroed (i.e. invalid and to be discarded). Vertical line 131 indicates where valid signal begins, vertical line 133 indicates where valid signal stop and blanking should begin, vertical line 135 indicates where blanking should end and valid signal begins again, and vertical line 137 indicates where valid signal ends. Note that the signal 132 after blanking is applied is shown both before windowing and after window 136 is applied.

Figure 23:
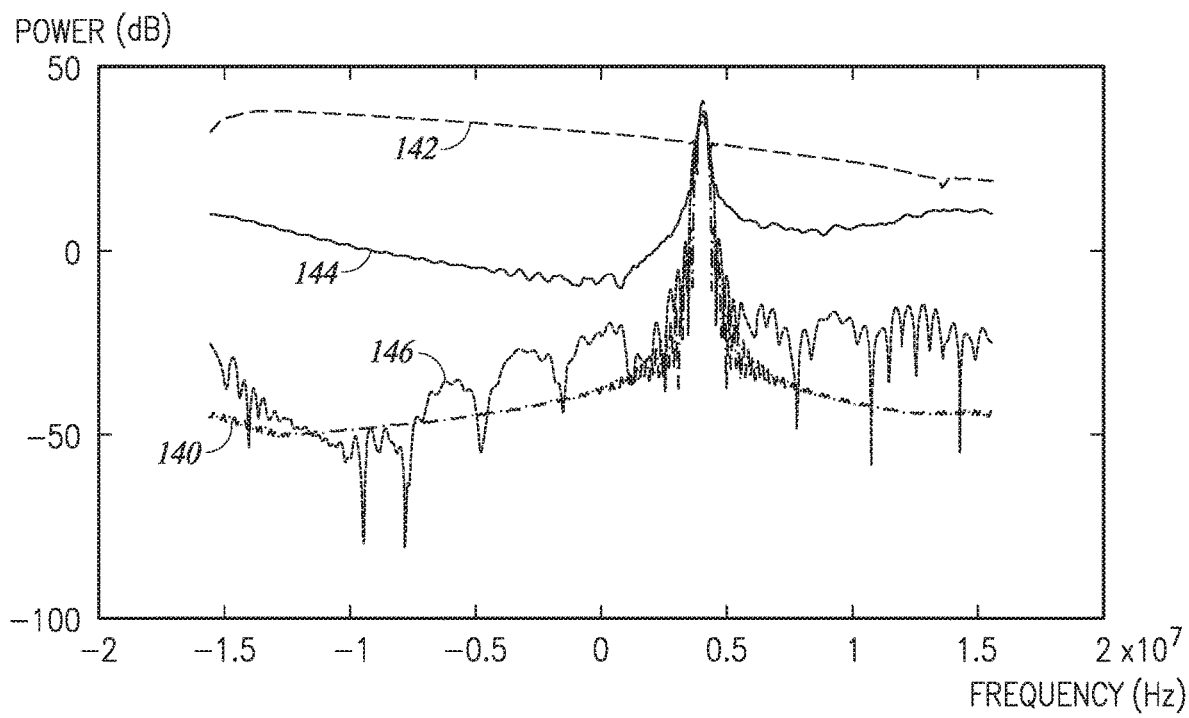
FIG. 23 is a diagram illustrating a first example IF range spectrum with interference and windowed blanking.

A diagram illustrating a first example IF range spectrum with interference and windowed blanking is shown in FIG. 23. The fast Fourier transform (FFT) of the windowed signal 132 (FIG. 19) is shown with no interference (signal 140), with interference (signal 142) and no interference blanking mitigation, with rectangular interference blanking mitigation (signal 144), and with windowed interference blanking mitigation (signal 146).

It is noted that as shown in the range FFT spectrum, if the interference is not mitigated (eliminated or blanked), the free dynamic range for target detection is severely degraded. If the interference samples are only zeroed, i.e. rectangular blanking, the dynamic range is improved but still far from the no interference case. If, however, windowed blanking is employed, the dynamic range available for detection is almost as good as the no interference case. Thus, significant detection improvement is achieved using windowed interference blanking mitigation.

Figure 24:
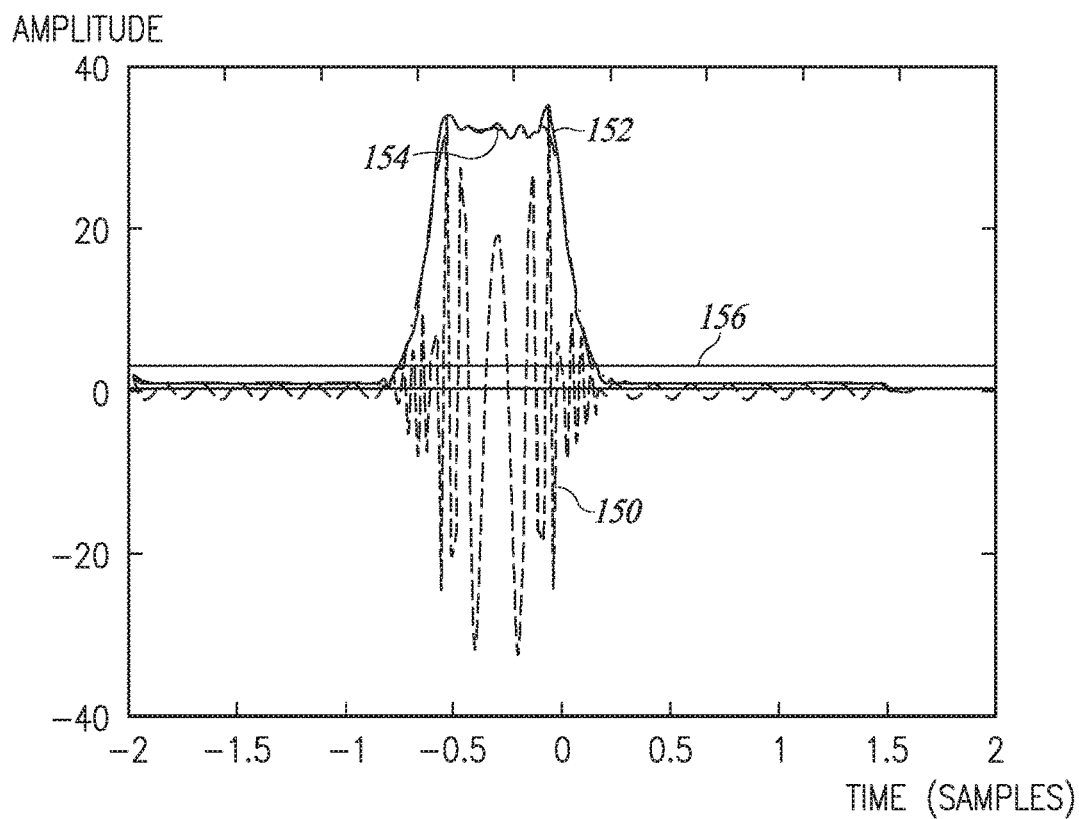
FIG. 24 is a diagram illustrating a second example time domain IF signal with interference.

A diagram illustrating a second example time domain IF signal with interference is shown in FIG. 24. In this example, the interference appears in the victim's radar IF bandwidth and occurs near the middle of a chirp interval. As in the case of FIG. 18, windowed blanking achieves far better results than no blanking or blanking with rectangular windowing. In the case of interference in the middle of a chirp, either (1) both portions of the chirp can be used, i.e. before and after the interference (as shown in FIG. 24, where the resulting peak appears divided as expected, or (2) use only the longer portion of the signal, whereby a wider peak is obtained but it is not divided.

The amplitude of the interference is approximately 30 dB stronger than the desired signal. To detect the interference, the envelope (e.g., complex envelope) of the signal is calculated and then smoothed. A threshold is then set at the 30% percentile, for example. It is appreciated that other threshold values can be used depending on the particular application. Interference detection (i.e. whenever the smoothed envelope exceeds the threshold) are filtered, e.g., using a median filter. Then areas where the desired signal is free of interference are identified, and each is multiplied by a window with matching length. Signal processing then proceeds as usual, e.g., range FFT calculation, Doppler FFT calculation, etc.

In particular, with reference to FIG. 24, the time domain signal output of the IF stage (signal 150) of the victim radar is corrupted with the interferer's radar chirp. The complex envelope of the signal is calculated (signal 152) as well as a filtered or smoothed envelope (i.e. after low pass filtering) (signal 154). A threshold 146 is determined using any suitable method to apply to the smoothed envelope. Any part of the signal that is above the threshold is blanked (i.e. zeroed). Note that one method of determining the threshold is to calculate a percentile of the smoothed envelope value plus some positive bias.

Figure 25:
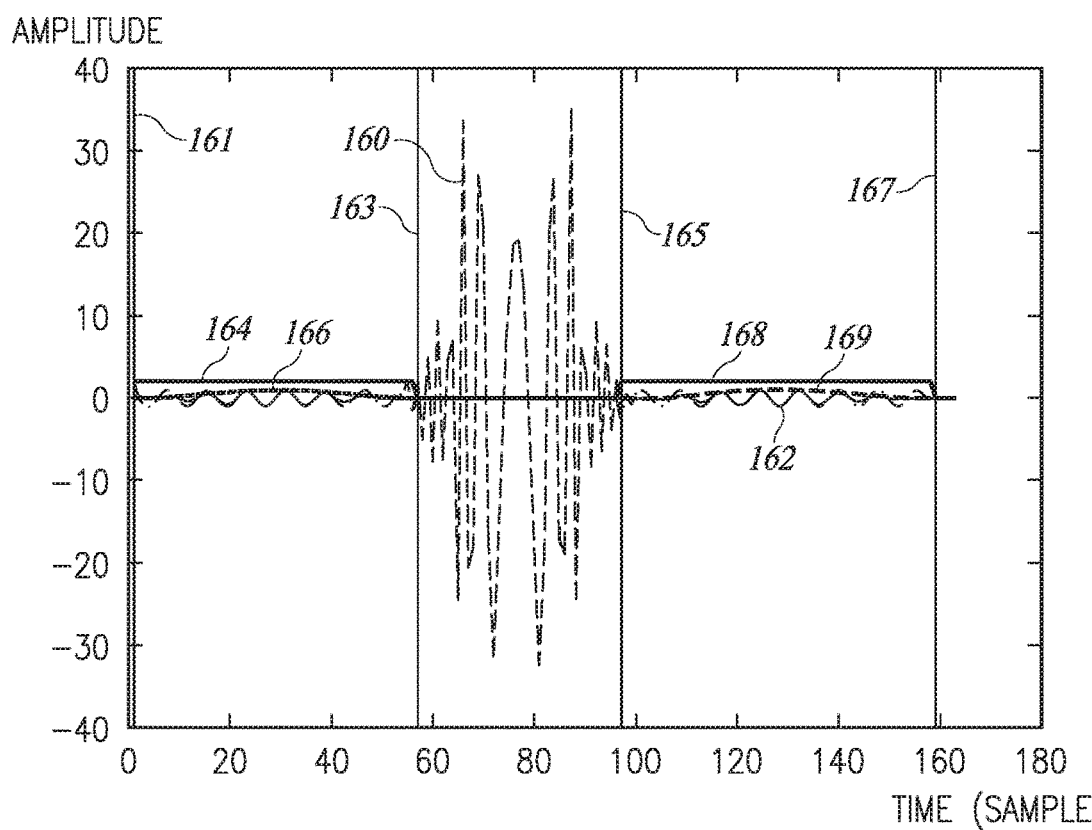
FIG. 25 is a diagram illustrating a second example time domain IF signal with interference before and after blanking.

A diagram illustrating a second example time domain IF signal with interference before and after blanking is shown in FIG. 25. The signal 160 is shown before blanking. A high level of blanking signals 164, 168 indicates portions of the signal that are valid and to be used while a low level represents those portions of the signal to be zeroed (i.e. invalid and to be discarded). Vertical line 161 indicates where valid signal begins, vertical line 163 indicates where valid signal stops and blanking should begin, vertical line 165 indicates where blanking should end and valid signal begins again, and vertical line 167 indicates where valid signal ends. Note that the signal 162 after blanking is applied is shown both before windowing and after windows 166 and 169 are applied.

Figure 26:
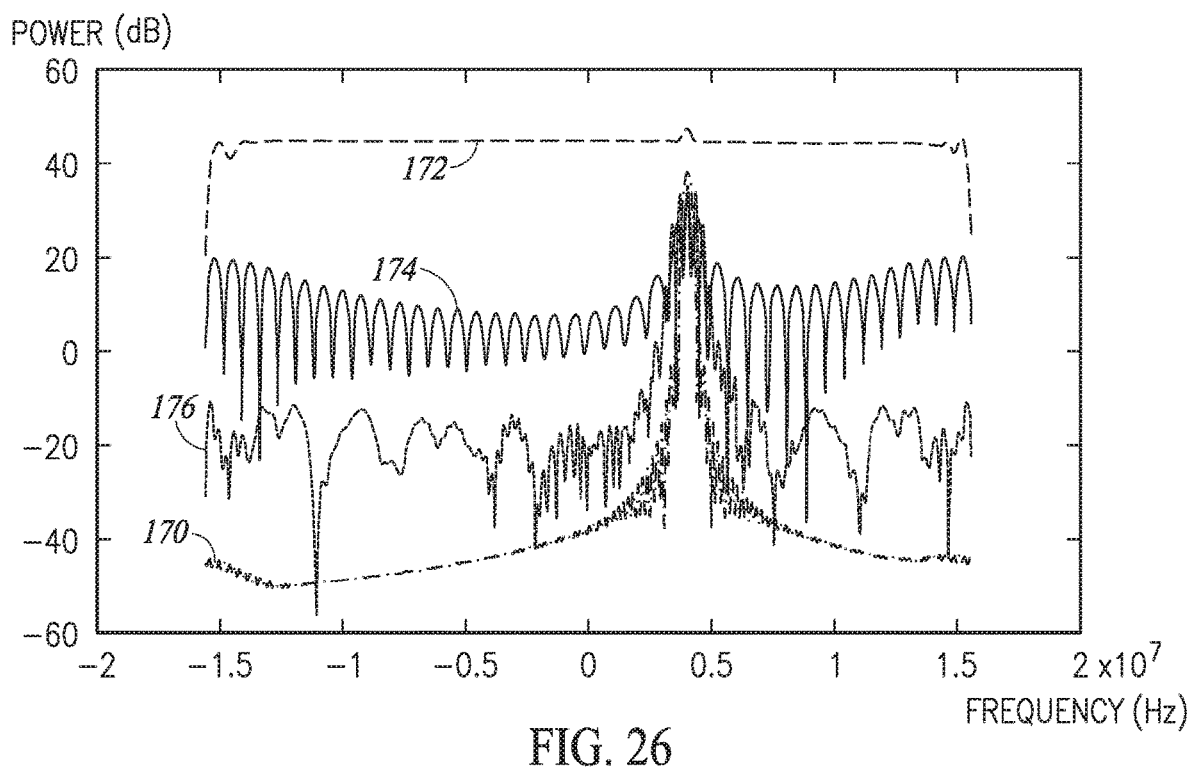
FIG. 26 is a diagram illustrating a second example IF range spectrum with interference and windowed blanking.

A diagram illustrating a second example IF range spectrum with interference and windowed blanking is shown in FIG. 26. The fast Fourier transform (FFT) of the windowed signal 162 (FIG. 22) is shown with no interference (signal 170), with interference (signal 172) and no interference blanking mitigation, with rectangular interference blanking mitigation (signal 174), and with windowed interference blanking mitigation (signal 176).

It is noted that as shown in the range FFT spectrum, if the interference is not mitigated (eliminated or blanked), the free dynamic range for target detection is severely degraded. If the interference samples are only zeroed, i.e. rectangular blanking, the dynamic range is improved but still far from the no interference case. If, however, windowed blanking is employed, the dynamic range available for detection is almost as good as the no interference case. Thus, significant detection improvement is achieved using windowed interference blanking mitigation.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of mitigating interference in a radar, the method comprising:
   for each coherent processing interval (CPI), generating a plurality of frequency modulated continuous wave (FMCW) chirps having less than full bandwidth and duration less than the CPI;
   randomizing starting frequencies of said plurality of chirps within each CPI thereby establishing a pseudo random hopping sequence;
   wherein said randomized starting frequencies span the full bandwidth; and
   wherein a reflected plurality of chirps signal is reassembled using said pseudo random hopping sequence to provide similar resolution as a single chirp spanning the full bandwidth.

2. The method according to claim 1, wherein said plurality of chirps are randomized over a coherent processing interval (CPI).

3. The method according to claim 1, wherein said randomization is operative to break coupling between Doppler induced phase evolution and range induced phase evolution from one chirp to a next chirp.

4. A method of mitigating interference in a victim radar, the method comprising:
   for each coherent processing interval (CPI), generating a plurality of frequency modulated continuous wave (FMCW) chirps having less than full bandwidth and duration less than the CPI;
   randomizing starting frequencies of said plurality of chirps within each CPI thereby establishing a pseudo random hopping sequence;
   detecting one or more interfering radar chirp signals;
   constraining said randomization such that a number of victim radar chirps that collide with interfering radar chirps in a time-frequency domain is minimized;
   wherein said randomized starting frequencies span a the full bandwidth; and
   wherein a reflected plurality of chirps signal is reassembled using said pseudo random hopping sequence to provide similar resolution as a single chirp spanning the full bandwidth.

5. The method according to claim 4, wherein said detecting comprises detecting and estimating one or more chirp parameters of said interfering radar.

6. The method according to claim 4, wherein said constraining comprises modifying the starting frequency of victim radar chirps to avoid collisions with interfering radar chirps.

7. The method according to claim 4, wherein said constraining comprises maintaining original starting frequencies of victim radar chirps but after randomization replacing chirp hop sequences estimated to collide with interfering radar chirps with one or more chirps that do not collide therewith.

8. The method according to claim 7, further comprising reassigning replaced victim radar chirps to one or more different time slots.

9. The method according to claim 4, wherein constraining comprises modifying a sign of a slope of each victim radar chirp.

10. A method of mitigating interference in a victim radar, the method comprising:
    for each coherent processing interval (CPI), generating a plurality of frequency modulated continuous wave (FMCW) chirps having less than full bandwidth and duration less than the CPI;
    randomizing starting frequencies of said plurality of chirps within each CPI;
    detecting one or more interfering radar chirp signals;
    blanking on receive one or more victim radar chirps or a portion thereof that are corrupted by interfering radar chirps; and
    wherein said randomized starting frequencies span a the full bandwidth.

11. The method according to claim 10, further comprising the victim radar ceasing chirp transmission upon detecting interference thereby minimizing interference inflicted by victim radar on nearby interfering radars.

12. The method according to claim 10, wherein blanking comprises:
    generating an intermediate frequency (IF) signal;
    calculating a complex envelope of said IF signal;

applying a threshold to said complex envelope; and
zeroing all values above the threshold.

13. A sensor for use in a victim automotive radar, comprising:
- a first plurality of transmitting antennas;
- a second plurality of receiving antennas;
- a transceiver coupled to said first plurality of transmitting antennas and said second plurality of receiving antennas, said transceiver operative to generate and supply transmitting signals to said first plurality of transmitting antennas and receive signals of waves reflected back to said second plurality of receiving antennas;
- said transceiver operative to:
- for each coherent processing interval (CPI), generate a plurality of frequency modulated continuous wave (FMCW) chirps having less than full bandwidth and duration less than the CPI;
- randomize starting frequencies of said plurality of chirps within each CPI;
- detect one or more interfering radar chirp signals;
- wherein said randomized starting frequencies span a the full bandwidth; and
- wherein a reflected plurality of chirps signal is reassembled using said pseudo random hopping sequence to provide similar resolution as a single chirp spanning the full bandwidth.

14. The sensor according to claim 13, further comprising said transceiver operative to constrain said randomization such that a number of victim radar chirps that collide with interfering radar chirps in a time-frequency domain is minimized.

15. The sensor according to claim 14, wherein said constraining comprises modifying the starting frequency of victim radar chirps to avoid collisions with interfering radar chirps.

16. The sensor according to claim 14, wherein said constraining comprises maintaining original starting frequencies of victim radar chirps but after randomization replacing chirp hop sequences estimated to collide with interfering radar chirps with one or more chirps that do not collide therewith.

17. The sensor according to claim 13, further comprising said transceiver operative to blank one or more received chirps or a portion thereof when interference is detected.

18. The sensor according to claim 13, further comprising the victim radar ceasing to transmit chirps while interference is detected thereby minimizing the interference inflicted at nearby interfering radars.

* * * * *